US012585529B2

(12) United States Patent
Martin et al.

(10) Patent No.: US 12,585,529 B2
(45) Date of Patent: Mar. 24, 2026

(54) GENERATION AND EXECUTION OF PROCESSING WORKFLOWS FOR CORRECTING DATA QUALITY ISSUES IN DATA SETS

(71) Applicant: Ab Initio Technology LLC, Lexington, MA (US)

(72) Inventors: Jonathan Martin, Reading (GB); Adam Weiss, Lexington, MA (US)

(73) Assignee: Ab Initio Technology LLC, Lexington, MA (US)

( * ) Notice: Subject to any disclaimer, the term of this patent is extended or adjusted under 35 U.S.C. 154(b) by 322 days.

(21) Appl. No.: 17/683,984

(22) Filed: Mar. 1, 2022

(65) Prior Publication Data

US 2022/0276920 A1     Sep. 1, 2022

Related U.S. Application Data

(60) Provisional application No. 63/155,148, filed on Mar. 1, 2021.

(51) Int. Cl.
*G06F 11/00*          (2006.01)
*G06F 11/07*          (2006.01)
(Continued)

(52) U.S. Cl.
CPC ........ *G06F 11/0793* (2013.01); *G06F 16/215* (2019.01); *G06Q 10/06311* (2013.01); *G06Q 10/06316* (2013.01)

(58) Field of Classification Search
CPC .......................... G06F 11/0793; G06F 11/0751
(Continued)

(56) References Cited

U.S. PATENT DOCUMENTS 6,701,451 B1 *   3/2004   Cohen .................. G06F 11/0727
                                                              714/42
7,428,663 B2 *   9/2008   Morton ............... G06F 11/2273
                                                              714/36
(Continued)

FOREIGN PATENT DOCUMENTS

| CN | 111143334 | 5/2020 |
| JP | 2007-179363 A | 7/2007 |
| JP | 2014-048699 A | 3/2014 |

OTHER PUBLICATIONS

International Search Report and Written Opinion in International Appln. No. PCT/US2022/018310, dated Jun. 23, 2022, 16 pages.
(Continued)

*Primary Examiner* — Sarai E Butler
(74) *Attorney, Agent, or Firm* — Fish & Richardson P.C.

(57)          ABSTRACT

Systems and methods are for executing, by a data processing system, a workflow to process results data indicating an output of a data quality test on data records by generating, responsive to receiving the results data and metadata describing the results data, a data quality issue associated with a state and one or more processing steps of the workflow to resolve a data quality error associated with the data quality test. Operations include generating a workflow for processing results data based a state specified by a data quality issue. Generating the workflow includes: assigning, based on the results data and the state of the data quality issue, an entity responsible for resolving the data quality error; determining, based on the metadata, one or more actions for satisfying the data quality condition specified in the data quality test; and updating the state associated with the data quality issue.

30 Claims, 14 Drawing Sheets

(51) Int. Cl.
*G06F 16/215* (2019.01)
*G06Q 10/0631* (2023.01)

(58) Field of Classification Search
USPC ........................................................ 714/1–57
See application file for complete search history.

(56) References Cited

U.S. PATENT DOCUMENTS

| | | | | |
|---|---|---|---|---|
| 7,480,816 B1* | 1/2009 | Mortazavi | ........... | G06F 11/1482 714/10 |
| 8,601,326 B1* | 12/2013 | Kirn | .................... | G06F 16/2365 714/26 |
| 8,863,085 B1* | 10/2014 | Stahlberg | ........... | G06F 11/3668 717/124 |
| 8,949,187 B1* | 2/2015 | Satish | ................ | G06F 11/1461 707/649 |
| 9,229,845 B1* | 1/2016 | Chandrasekharapuram | ................ G06F 11/3692 |
| 10,489,360 B2 | 11/2019 | Procops et al. | | |
| 2002/0078403 A1* | 6/2002 | Gullo | .................... | G06F 11/008 714/37 |
| 2002/0162057 A1* | 10/2002 | Talagala | ................ | G06F 11/008 714/E11.144 |
| 2003/0056147 A1* | 3/2003 | Yutkowitz | .............. | G05B 11/28 714/25 |
| 2003/0169699 A1* | 9/2003 | Haardt | ............... | H04B 7/18589 370/321 |
| 2006/0095812 A1* | 5/2006 | Gerard | ................ | G06F 11/3636 714/38.1 |
| 2006/0129876 A1* | 6/2006 | Uemura | .............. | G06F 11/1076 714/E11.034 |

| | | | | |
|---|---|---|---|---|
| 2010/0223226 A1 | 9/2010 | Alba et al. | | |
| 2011/0055620 A1* | 3/2011 | Sengupta | ................ | G06F 16/93 714/37 |
| 2012/0311381 A1* | 12/2012 | Porterfield | .......... | G06F 11/2053 714/E11.054 |
| 2013/0332779 A1* | 12/2013 | Hainzl | ............... | G05B 23/0237 714/47.1 |
| 2014/0195448 A1* | 7/2014 | Scarbrough | ........ | G06Q 30/0259 705/342 |
| 2015/0169395 A1* | 6/2015 | Giffels | ................ | G06F 11/3409 714/57 |
| 2016/0012153 A1* | 1/2016 | Gralnick | ............. | G06F 16/9024 707/743 |
| 2017/0091016 A1* | 3/2017 | Vulich | .................. | G06F 9/4881 |
| 2017/0351991 A1* | 12/2017 | Halberstadt | ......... | G06F 16/2365 |
| 2018/0329807 A1* | 11/2018 | Atyam | ............... | G06F 11/3688 |
| 2018/0373579 A1* | 12/2018 | Rathore | ............... | H03M 13/01 |
| 2020/0104236 A1* | 4/2020 | Creel | ................. | G06F 16/2365 |
| 2020/0210401 A1 | 7/2020 | Swami et al. | | |
| 2021/0064515 A1* | 3/2021 | Xu | ........................ | G06N 3/0499 |
| 2021/0216526 A1* | 7/2021 | Barrett | .................. | G06F 11/302 |
| 2021/0382862 A1* | 12/2021 | Maxey | .................. | G06F 16/248 |

OTHER PUBLICATIONS

International Preliminary Report on Patentability in International Appln. No. PCT/US2022/018310, mailed on Aguust 29, 2023, 11 pages.
International Preliminary Report on Patentability in International Appln. No. PCT/US2022/018310, mailed on Sep. 14, 2023, 11 pages.
Office Action in Japanese Appln. No. 2023-547187, mailed on Oct. 16, 2025, 6 pages (with English translation).

\* cited by examiner

Figure 3:
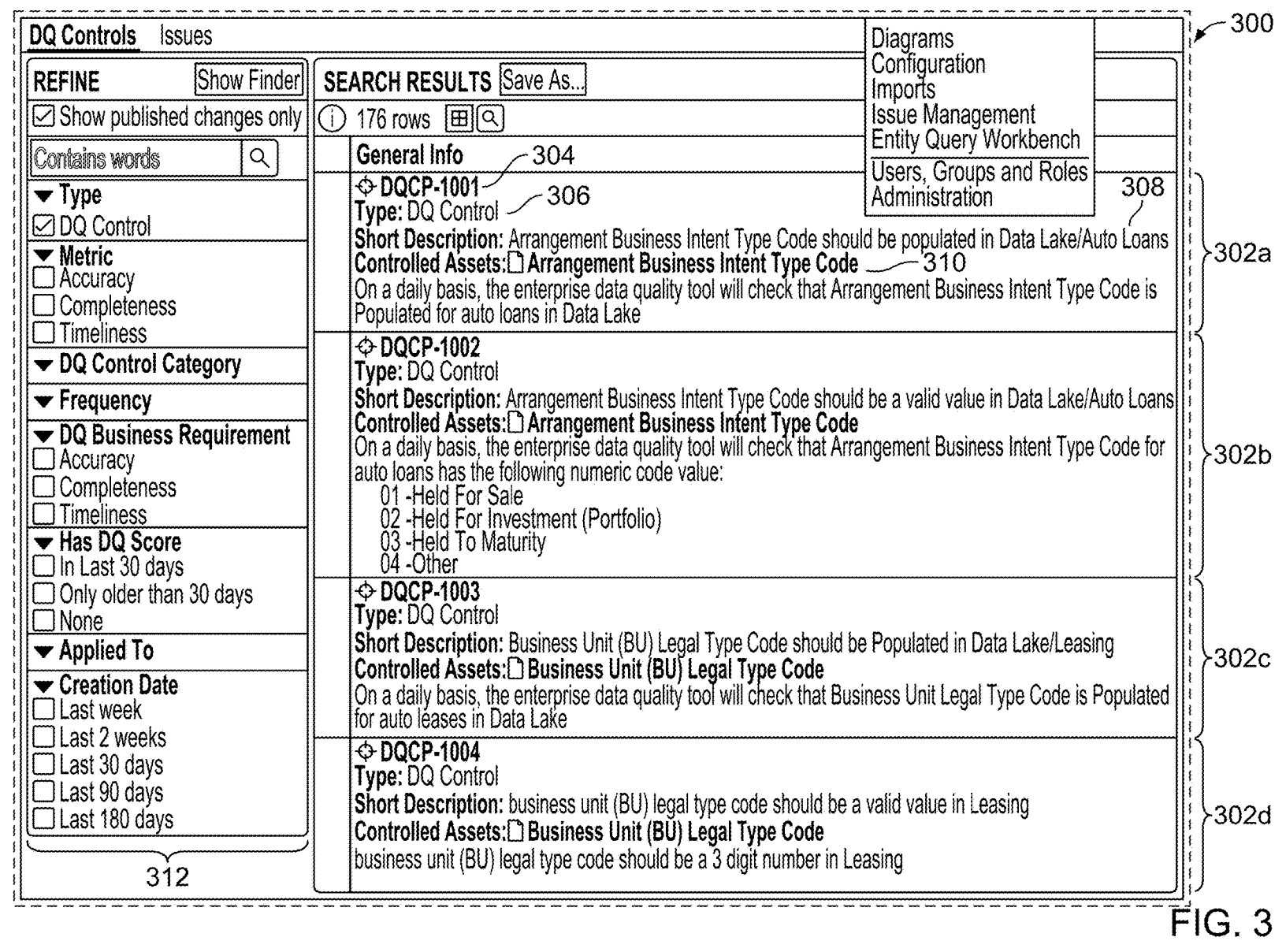

DQ Controls   Issues

REFINE    Show Finder

☑ Show published changes only

Contains words   🔍

▶ Type
☑ DQ Control

▶ Metric
☐ Accuracy
☐ Completeness
☐ Timeliness

▶ DQ Control Category

▶ Frequency

▶ DQ Business Requirement
☐ Accuracy
☐ Completeness
☐ Timeliness

▶ Has DQ Score
☐ In Last 30 days
☐ Only older than 30 days
☐ None

▶ Applied To

▶ Creation Date
☐ Last week
☐ Last 2 weeks
☐ Last 30 days
☐ Last 90 days
☐ Last 180 days

312

SEARCH RESULTS   Save As...

ⓘ 176 rows ⊞ 🔍

General Info  — 304

Diagrams
Configuration
Imports
Issue Management
Entity Query Workbench
Users, Groups and Roles
Administration  — 308

◇ DQCP-1001 —306
Type: DQ Control
Short Description: Arrangement Business Intent Type Code should be populated in Data Lake/Auto Loans
Controlled Assets:☐ Arrangement Business Intent Type Code —310
On a daily basis, the enterprise data quality tool will check that Arrangement Business Intent Type Code is Populated for auto loans in Data Lake ◇ DQCP-1002
Type: DQ Control
Short Description: Arrangement Business Intent Type Code should be a valid value in Data Lake/Auto Loans
Controlled Assets:☐ Arrangement Business Intent Type Code
On a daily basis, the enterprise data quality tool will check that Arrangement Business Intent Type Code for auto loans has the following numeric code value:
01 -Held For Sale
02 -Held For Investment (Portfolio)
03 -Held To Maturity
04 -Other ◇ DQCP-1003
Type: DQ Control
Short Description: Business Unit (BU) Legal Type Code should be Populated in Data Lake/Leasing
Controlled Assets:☐ Business Unit (BU) Legal Type Code
On a daily basis, the enterprise data quality tool will check that Business Unit Legal Type Code is Populated for auto leases in Data Lake ◇ DQCP-1004
Type: DQ Control
Short Description: business unit (BU) legal type code should be a valid value in Leasing
Controlled Assets:☐ Business Unit (BU) Legal Type Code
business unit (BU) legal type code should be a 3 digit number in Leasing

Figure 4:
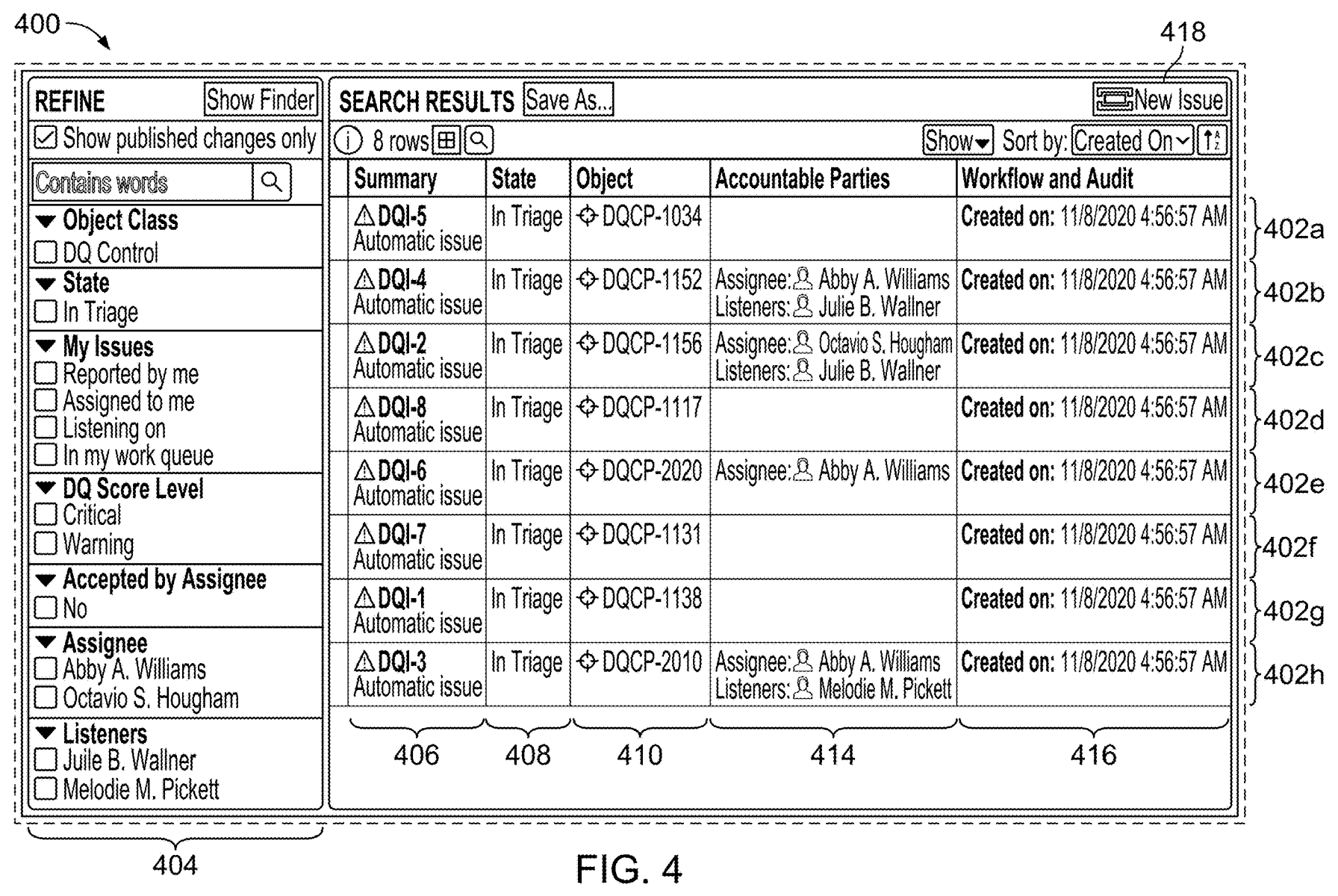

400

REFINE    Show Finder

☑ Show published changes only

Contains words 🔍

▼ Object Class
☐ DQ Control

▼ State
☐ In Triage

▼ My Issues
☐ Reported by me
☐ Assigned to me
☐ Listening on
☐ In my work queue ▼ DQ Score Level
☐ Critical
☐ Warning ▼ Accepted by Assignee
☐ No ▼ Assignee
☐ Abby A. Williams
☐ Octavio S. Hougham ▼ Listeners
☐ Julie B. Wallner
☐ Melodie M. Pickett

404

SEARCH RESULTS   Save As...

ⓘ 8 rows ⊞ 🔍      Show ▾   Sort by Created On ▾   ↑ᴬᵤ

New Issue

418

| Summary | State | Object | Accountable Parties | Workflow and Audit | |
|---|---|---|---|---|---|
| △ DQI-5 Automatic issue | In Triage | ◇ DQCP-1034 | | Created on: 11/8/2020 4:56:57 AM | 402a |
| △ DQI-4 Automatic issue | In Triage | ◇ DQCP-1152 | Assignee: ⊘ Abby A. Williams Listeners: ⊘ Julie B. Wallner | Created on: 11/8/2020 4:56:57 AM | 402b |
| △ DQI-2 Automatic issue | In Triage | ◇ DQCP-1156 | Assignee: ⊘ Octavio S. Hougham Listeners: ⊘ Julie B. Wallner | Created on: 11/8/2020 4:56:57 AM | 402c |
| △ DQI-8 Automatic issue | In Triage | ◇ DQCP-1117 | | Created on: 11/8/2020 4:56:57 AM | 402d |
| △ DQI-6 Automatic issue | In Triage | ◇ DQCP-2020 | Assignee: ⊘ Abby A. Williams | Created on: 11/8/2020 4:56:57 AM | 402e |
| △ DQI-7 Automatic issue | In Triage | ◇ DQCP-1131 | | Created on: 11/8/2020 4:56:57 AM | 402f |
| △ DQI-1 Automatic issue | In Triage | ◇ DQCP-1138 | | Created on: 11/8/2020 4:56:57 AM | 402g |
| △ DQI-3 Automatic issue | In Triage | ◇ DQCP-2010 | Assignee: ⊘ Abby A. Williams Listeners: ⊘ Melodie M. Pickett | Created on: 11/8/2020 4:56:57 AM | 402h |
| 406 | 408 | 410 | 414 | 416 | |

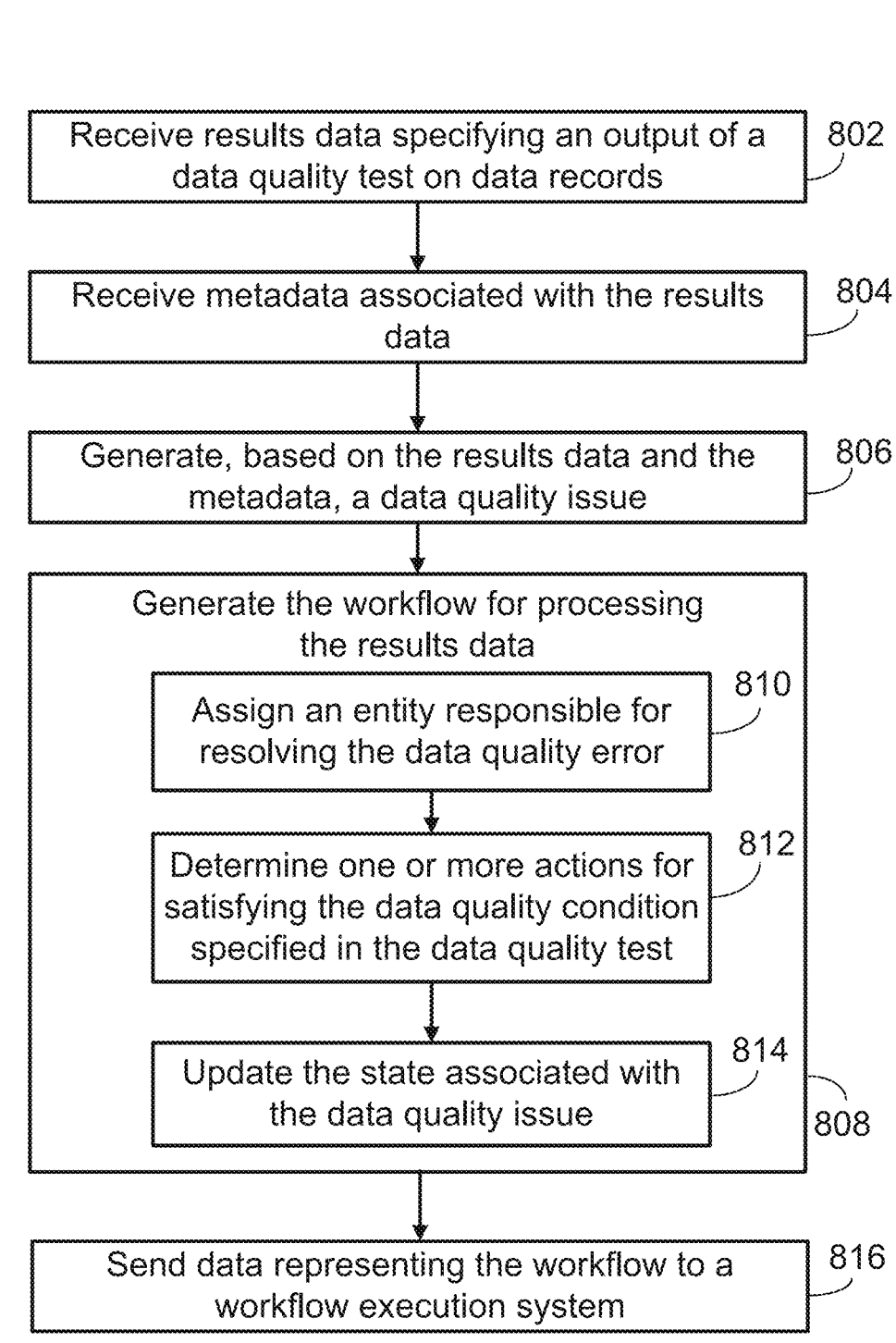

Receive results data specifying an output of a
data quality test on data records — 802

Receive metadata associated with the results
data — 804

Generate, based on the results data and the
metadata, a data quality issue — 806

Generate the workflow for processing
the results data

Assign an entity responsible for
resolving the data quality error — 810

Determine one or more actions for
satisfying the data quality condition
specified in the data quality test — 812

Update the state associated with
the data quality issue — 814

808

Send data representing the workflow to a
workflow execution system — 816

FIG. 8

GENERATION AND EXECUTION OF PROCESSING WORKFLOWS FOR CORRECTING DATA QUALITY ISSUES IN DATA SETS

CLAIM OF PRIORITY

This application claims priority under 35 U.S.C. § 119(e) to U.S. Patent Application Ser. No. 63/155,148, filed on Mar. 1, 2021, the entire contents of which are hereby incorporated by reference.

TECHNICAL FIELD

This disclosure relates to generating workflows to correct data quality issues in data sets automatically. More specifically, this disclosure relates to identifying a data quality issue in a data set and generating a data processing workflow for correcting the data quality issue based on whether the data quality issue is new or reoccurring.

BACKGROUND

Computer systems can be used to transmit, receive, and/or process data. For instance, a server computer system can be used to receive and store resources (e.g., web content, such as a webpage), and make the content available to one or more client computer systems. Upon receiving a request for the content from a client computer system, the server computer system can retrieve the requested content, and transmit the content to the client computer system to fulfill the request.

A set of data can include data values stored in data fields. A data field can include one or more of the data values. Many instances of the data field can exist in the dataset (e.g., in different fields).

Data fields can have data quality errors in which a value of the data field fails to satisfy one or more standards for the values of that data field. Once a data quality error is identified, it can be difficult to determine how to correct the data quality error without analysis of context of the data quality error.

SUMMARY

The data processing system described in this document is configured for identifying data quality issues in data sets and generating data processing workflows to correct the data quality issues in an automatic manner. The data processing system receives results from a data quality analysis of one or more data sets. The data quality analysis determines whether values in the data sets are passing or failing one or more data quality tests for those data sets. The data processing system receives the results data of the data quality analysis.

The data processing system is configured to determine, based on the data included in the results data, whether to generate a new data quality issue representing the data quality test, or whether the results data represents an existing data quality issue. A data quality issue includes data associated with a data quality test on a particular data set. The data quality issue includes data specifying which rules are applied in the data quality test, results for testing each data quality rule, and an identification of the particular data set being tested. The data quality issue therefore includes the results data of the data quality test and metadata that uniquely identifies the data quality test.

The data quality issue generated by the data processing system is associated with an identifier that uniquely identifies the data quality issue and a state that represents a position in a data processing workflow corresponding to the data quality issue. The identifier can include a key value that is used to associate the data quality issue with additional data. For example, the additional data can include identifiers of client device(s) associated with the data quality issue, an owner of the data set with the data quality issue, an entity responsible for resolving the data quality issue, the workflow for correcting the data quality issue, and the state of the workflow. The data processing system is configured to generate new data quality issue data for new data quality issues identified in the results data or update existing data quality issue data for reoccurring data quality issues in the results data.

Once the data quality issue is generated or updated, the data processing system configures a data processing workflow for resolving the data quality issue. The data processing workflow includes a sequence of data processing steps that are selected based on the data in the data quality issue or associated with the data quality issue. For example, the data processing workflow can include actions or steps including assigning responsibility for resolving the data quality issue, generating a timeline for actions taken with respect to the data quality issue, Embodiments can include one or more of the following features.

In an aspect, a process is for executing, by a data processing system, a workflow to process results data indicating an output of a data quality test on data records by generating, responsive to receiving the results data and metadata describing the results data, a data quality issue associated with a state and one or more processing steps of the workflow to resolve a data quality error associated with the data quality test includes. The process includes receiving results data specifying an output of a data quality test on data records. The process includes receiving metadata associated with the results data, the metadata specifying a data quality condition of the data quality test and an object that configured the data quality test. The process includes generating based on the results data and the metadata, a data quality issue, the data quality issue specifying a state for a workflow for processing the results data. The process includes generating the workflow for processing the results data based the state specified by the data quality issue. Generating the workflow includes: assigning, based on the results data and the state of the data quality issue, an entity responsible for resolving the data quality error; determining, based on the metadata, one or more actions for satisfying the data quality condition specified in the data quality test; and updating the state associated with the data quality issue. The process includes sending data representing the workflow to a workflow execution system.

In some implementations, the data quality issue is associated with a key value that identifies the data quality issue. The process includes determining, in response to receiving the metadata, that the data quality issue is already generated for the data source for the data quality test by evaluating the key value. The process includes updating the data quality issue based on the results data of the data quality test, wherein updating the data quality issue includes changing the state associated with the data quality issue. In some implementations, updating the data quality issue includes reassigning the results data to a different entity. In some implementations, updating the data quality issue includes appending a timeline of data processing actions associated with the data quality issue. In some implementations, the process includes, in response to updating the data quality issue, determining that the data quality condition is satisfied. Changing the state associated with the data quality issue includes indicating that the data quality issue is associated with a resolved data quality error.

In some implementations, the process includes receiving scheduling data for associating with the data quality issue, the scheduling data causing the data quality test to execute at predefined time intervals. The process includes identifying the time interval associated with the data quality test. The process includes sending data representing the time interval to the assigned entity.

In some implementations, assigning the entity includes determining, from the data source, a set of eligible entities associated with the data source for being responsible for resolving the data quality error; receiving selection criteria from the data source for assigning the entity from the set of eligible entities; and assigning the entity based on the selection criteria. In some implementations, the selection criteria specify a type of data quality error, wherein the metadata associated with the results data specify that the data quality issue is associated with the type of data quality error, and wherein the entity is eligible to resolve the type of data quality error. In some implementations, the selection criteria specify a particular state of the data quality issue for each entity of the set of eligible entities, and wherein the state of the data quality issue is the particular state for the assigned entity.

In some implementations, the entity is a particular device of the data processing system.

In some implementations, the entity is a user of the data processing system.

In some implementations, executing the workflow further includes generating a timeline of actions taken for processing the results data and sending data representing the timeline of actions taken to the entity.

In some implementations, each state of the data quality issue is associated with one or more candidate actions for processing the results data.

In some implementations, the process includes determining, based on the results data and the metadata, a category of the data quality error, the category being selected from one of a data error, a rule error, or a reference data error.

Any of these processes can be implemented as systems including one or more processing devices and memory storing instructions that, when executed by the one or more processing devices, are configured to cause the one or more processing devices to perform the operations of the processes. In some implementations, one or more non-transitory computer readable media can be configured to store instructions that, when executed by the one or more processing devices, are configured to cause the one or more processing devices to perform the operations of the processes.

There may be a feedback loop for data quality (DQ) issues in the DQ result data; reoccurring issues are updated with new result data and new metadata. Different DQ items can be generated/updated based on which DQ tests failed and how they failed (e.g., which threshold condition was not satisfied).

Data items (representing DQ issues) can be repeatedly updated with new metadata as new DQ results are received; the corresponding workflow is automatically updated. The system can avoid generating a new DQ item for reoccurring DQ problem; an existing DQ item is then updated instead.

There may be a customizable workflow used for each data quality issue; the workflow is automatically configured based on metadata associated with DQ issue. Metadata can be used to configure the workflow associated with the DQ item; there can be different behaviors for different DQ issues.

A workflow may include assignment of responsibility of handling DQ issue, processing actions to perform for handling DQ issue (e.g., further analysis of values of data records to determine if a DQ rule definition is flawed). The assignment of responsibility can change based on the current state associated with the DQ item (escalation can occur as state of workflow changes).

The system can generate a timeline of responsibility associated with the DQ item based on what the state is for the workflow execution of the DQ item.

The system generates a timeline of responsibility associated with the DQ item based on what the state is for the workflow execution of the DQ item.

Aspects can include one or more advantages. Reoccurring data quality issues can be recognized and assigned to a different entity (escalation). A timeline can be generated showing how the issue has changed over time and who has been trying to resolve it. Metadata associated with each data item identifies the exact data quality thresholds that were not satisfied. This can indicate that the issue may be that the rule is defined improperly, rather than that the data have low data quality. Each workflow is configurable because each state can specify a different set of available actions for resolving the data quality error.

Additionally, there is considerable flexibility in the configuration of rules for populating the data quality issues and generating the workflows. The flexibility of generating different workflows for similar data quality issues enables a wide range of users to tailor the system to meet their specific needs and gain maximum benefit from the automatic generation of issues.

There is a feedback loop for handling data quality (DQ) issues in the DQ result data. Reoccurring issues are updated with new result data and new metadata. The customizable workflow for each data quality issue is automatically configured based on metadata associated with DQ issue. A state is maintained for each DQ issue. The state corresponds to a portion of the workflow. When a data quality issue is reoccurring, a different workflow action can be generated based on the current state of the workflow. This enables automatic escalation of an assigned responsible entity (e.g., for reoccurring data quality issues).

The data processing system is configured to manage data quality issues over a large, complex data network. At scale, data are generated and transferred in a complex manner, such as in many software environments, different datasets, different countries, and so forth. Because people are constantly changing and moving, the data processing system can reliably delegate responsibility for resolution of the data quality issues and automatically escalate to another entity if needed. In some implementations, the data processing system can generate a workflow configured to quarantine data with severe data quality issues to prevent pristine data in other parts of a networked system from being contaminated. For example, data quality issues are repeatedly updated with new metadata as new data quality test results are received. A corresponding workflow is automatically updated.

Workflows are automatically generated that include assignment of responsibility of handling data quality issue and/or processing actions to perform for handling data quality issue (e.g., further analysis of values of data records to determine if a data quality rule definition is flawed). Metadata from the data quality test are used to configure the workflow associated with the data quality issue using configurable rules. As a result, different workflows are proposed by the data processing system based on which data quality tests failed and how they failed (e.g., which data quality threshold condition was not satisfied).

The system avoids generating a new data quality issue for reoccurring data quality problems. Rather, existing data quality issues are updated instead. The assignment of responsibility can change based on the current state associated with the data quality issue. For example, escalation can occur as state of workflow changes. In some implementations, the data processing system can generate a timeline of responsibility associated with the data quality issue based on what the state is for the workflow execution of the data quality issue. The data processing system enables assignment of ownership automatically from metadata associated with the data quality issue, rather than being explicitly specified or defined for each data quality issue. Additionally, relevant attributes (e.g., metadata) are stored with the generated data quality issue. The attribute values are automatically updated when new data quality results are received from a data quality test process. The data processing system is thus configured to automatically recognize a reoccurring data quality problem and update the existing DQ item with new metadata for a comprehensive presentation to the user. The data processing system is configured to automatically determine when a data quality issue is resolved and tag issues as potentially resolved. For example, a workflow can be configured that specifies that a follow up be provided to a responsible entity. The entity (e.g., a user) then decides when to mark the data quality issue as resolved.

The details of one or more embodiments are set forth in the accompanying drawings and the description below. Other features and advantages will be apparent from the description and drawings, and from the claims.

BRIEF DESCRIPTION OF THE DRAWINGS

FIGS. 3-7 are example screens of user interfaces for the data processing systems of FIG. 1A-1B for automatic data quality issue generation and workflow execution.

FIG. 8 shows a flow diagram including an example process.

DETAILED DESCRIPTION

Figure 1A:
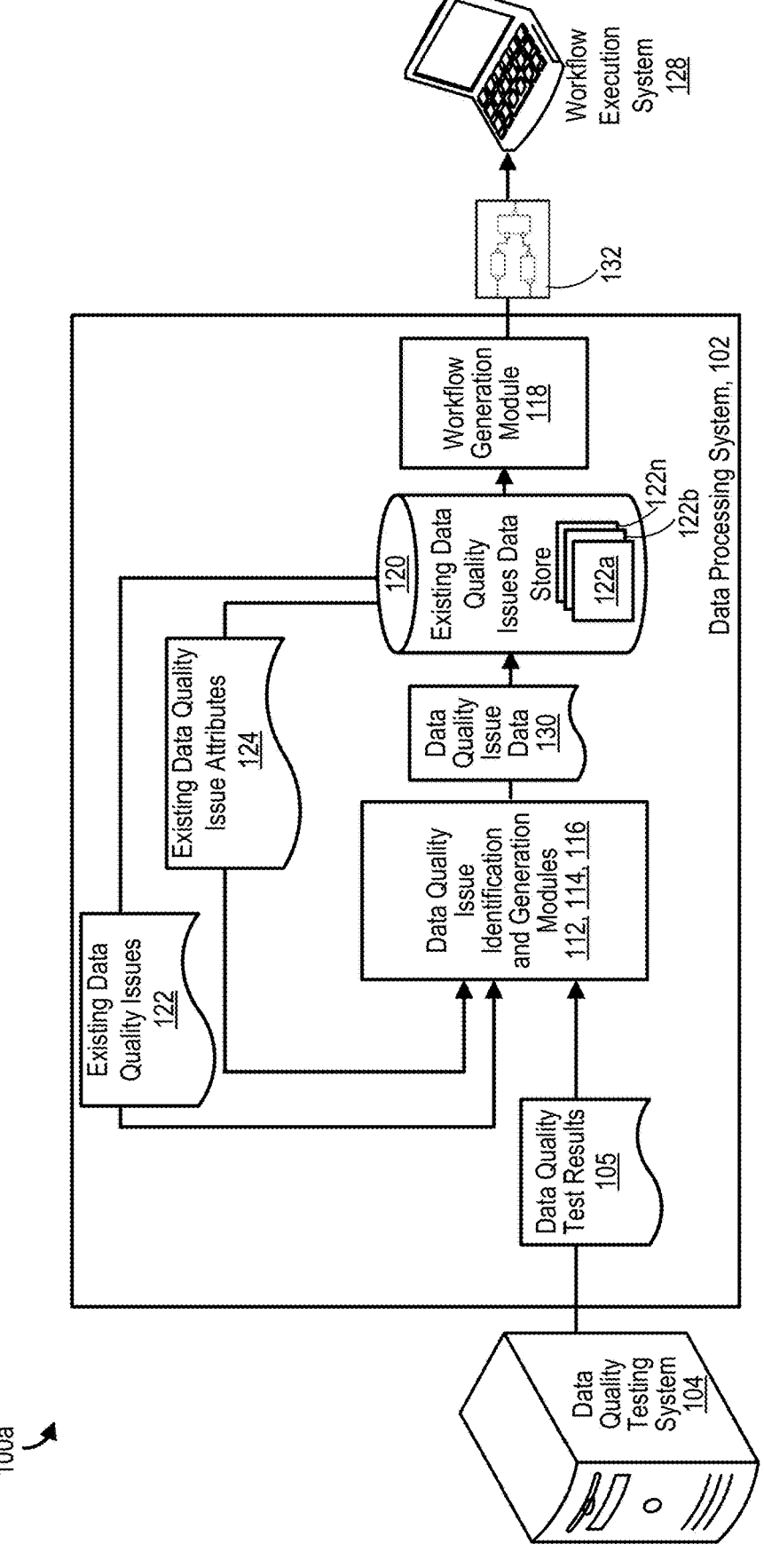
FIGS. 1A-2D are block diagrams of a data processing system for automatic data quality issue generation and workflow execution.

FIG. 1A shows a block diagram of an environment 100a including a data processing system 102. The data processing system 102 is configured to process data quality test results data 105 (also called result data or data quality results data). The results data includes an output from a data quality test of data records. The results data 105 specifies whether portions (e.g., values of fields) of the data records satisfy conditions specified in data quality rules applied to the data records during the data quality test applied by a data quality testing system 104. The results data 105 includes a report that identifies data quality rules that are not satisfied during the test and which records did not satisfy the data quality rules. The results data are subsequently described in detail.

The data processing system 102 is configured, by a data quality issue identification module 112, to identify data quality issues in the data records from the results data 105. A data quality issue includes data 130 that specifies a particular data quality error, problem or failure from the data quality test and possibly other data associated with that particular data quality error, problem or failure. The other data include attributes (e.g., metadata) specifying one or more of a name of the data record tested, an owner of the data record that is tested, a data domain, a data type, a rule identifier, data indicating whether the data record has previously been tested, a category or type of the data quality issue, an entity responsible for handling the data quality issue, a time period, a time stamp, and other metadata describing the data quality test. The data quality issue data 130 can include portions of the results data 105, such as data quality test report data. The data that are included in the data quality issues is subsequently described in further detail in relation to FIGS. 6A-6B. The other data can include one or more data objects associated with a workflow 132. As subsequently described, a workflow includes a sequence of data processing actions or steps for performing to resolve the data quality issue.

Each data quality test is configured using a control point 136. A control point 136 includes a data structure that enables configuration one or more attribute values associated with the workflow 132. The control point specifies which data quality tests are performed on which data. For example, a control point 136 can specify a particular data quality rule (or set of rules) for testing a particular field or record of a particular dataset. The control point 136 specifies the dataset to test, the rule(s) to apply, an owner of the tested data and test results, a schedule for performing the test, and so forth. If a data quality issue is found from the results of the data quality test, the control point is associated with the data quality issue. The control point includes an identifier that is used to identify any existing data quality issue that has previously been generated from a previous iteration of the data quality test configured by that control point. The control point is used to populate an associated data quality issue with attributes by one or more inheritance rules, as subsequently described. The control point associates the data quality issue with a generated workflow 132.

The data quality issue identification module 112 can distinguish between existing data quality issues and new data quality issues specified in the results data 105, such as by referring to the control point that generated the data quality issue. Existing data quality issues are data quality issues that refer to a data quality failure or problem in the data record that has previously been identified from the results data for that data record. The data quality issue is therefore not a new problem in the data, but a continuation or persistence of a data quality issue that is already being handled (e.g., by a system administrator or automatically by the data processing system 102). A new data quality issue represents data quality problems or failures in the data records that are identified for the first time by the data quality test in results data 105.

The data quality issue data 130 are stored as existing data quality issues 122a-n in a data store. The data quality issues 122a-n are referenced by the data quality issue identification module 112 (by their associated control points 136) when additional data quality test results 105 are received from the data quality testing system 104. The data processing system 102 thus includes a feedback loop in which reoccurring data quality issues are mapped to previously identified (e.g., configured) data quality issues in the data and previously generated workflows, and new data quality are newly associated with workflows for processing those new data quality issues. For example, configured data quality issues 122 are retrieved by the data quality issue identification module 112 from the data store 120 when the results data 105 are received from the data quality testing system 104. The existing data quality issues 122 are associated with attributes 124. The attributes 124 have values for populating the workflow. The values of the attributes can be configured by a system administrator or populated automatically from one or more data objects. For example, values of the attributes 124 can be retrieved from respective control points 136. The existing data quality issues 122 and their attributes 124 are retrieved by the data quality issue identification module 112. The module 112 uses the existing data quality issues 122 and their attributes 124 to determine whether new data quality issues should be generated or whether an existing data quality issue should be updated in response to receiving results data 105.

The data processing system 102 generates, by a workflow generation module 118, a workflow 132 for resolving the data quality issue. The workflow 132 includes a sequence or series of data processing steps for processing the data quality issue (e.g., to resolve data quality problems in the data record). The workflow 132 can be partially automated or entirely automated. The workflow 132 is configured automatically by the data processing system 102. A workflow 132 can include assignment of responsibility of processing the data quality issue depending on a context of the data quality issue. For example, a data quality issue is repeatedly identified when the data quality test is repeatedly indicating the particular data quality problem is persisting in the data record. This can be due to systemic error in generating the data record, updating the data record, a problem with a data quality rule definition, or some other issue. The persistent data quality issue can be escalated to a new entity if the data quality error persists in the data record over time (e.g., over several data quality tests). An entity in this context includes a user (e.g., a system administrator, employee, etc.) or a device (e.g., a client device). As new results data 105 are received by the data processing system 102, the workflows generated by the workflow generation module 118 can be updated or reconfigured to change how the data quality issue is being resolved (e.g., if the data quality issue is persisting over a period of time).

The workflows 132 include processing actions to perform for handling the data quality issues. For example, further analysis of values of data records can be scheduled to determine whether a data quality rule definition is flawed. In another example, data records from a source that causes a threshold number of data quality issues can be quarantined from other devices or systems in a computing network to prevent the spread of low quality data to other systems. For example, for a dynamic networked system, new systems and devices can be added and removed constantly. A new device may be uploading low-quality data to data records stored in the computing system (e.g., a global repository). To prevent the low quality data from propagating to other repositories, or to prevent the further uploading of low quality data, the data processing system 102 may temporarily and automatically restrict the new device from uploading data without performing a data quality check on the data prior to upload. This reduces or eliminates data quality errors in a system. At scale, this can greatly assist system administrators who may not be able to monitor all devices on the system at all times for data quality issues.

The data quality issue is associated with a state. The state indicates a location in an associated workflow 132 that is generated to resolve the data quality issue. Generally, if a data quality issue is unresolved, the state is maintained and indicates that further analysis or processing is required by the entity assigned responsibility for resolving the data quality issue. When new results data 105 are received, the data quality issue identification module 112 can identify that the data quality issue has previously been generated by referring to identifiers of the data quality issues that have a state indicated that resolution has not yet been achieved for that data quality issue.

The generated workflow 132 is sent from the data processing system 102 to a workflow execution system 128. The workflow execution system 128 can include any device configured to execute the logic of the workflow 132. For example, the workflow execution system 128 can include a client device, such as a system administrator device. In some implementations, the workflow execution device 128 includes a server or other backend device. Generally, the workflow execution device 128 is configured to present user interface data, subsequently described, showing the data quality issue and data related to one or more control points associated with the data quality issue in accordance with the workflow 132.

The data processing system 102 is configured to automatically populate the data quality issue and/or data quality workflow 132 with attributes (such as the responsible entity) based on a set of attribute inheritance rules. Here, an attribute is a portion of the metadata that is associated with the data quality issues and/or data quality test results 105. The attribute inheritance rules are configurable (e.g., can be predefined) for generating the data quality issues by the module 112. As subsequently described, the attribute inheritance rules determine which attributes of the data quality issue are automatically populated and which data sources are used for the values for those attributes. For example, the source attributes are either received from a data quality control point or from another object that is directly or indirectly associated with the data quality control point, as determined by a source attribute specifier. A source attribute specifier includes a domain name or owner identifier for a data source. The data source can include a device operated by a system administrator, business owner, and so forth.

The workflow generation module 118 uses the attributes to configure the workflow 132 associated with the data quality issue. As previously described, actions of the workflow can depend on the values of the attributes (e.g., metadata) associated with the data quality issue. The attribute values can be refreshed or updated when new data quality results 105 are received from the batch test process.

Figure 1B:
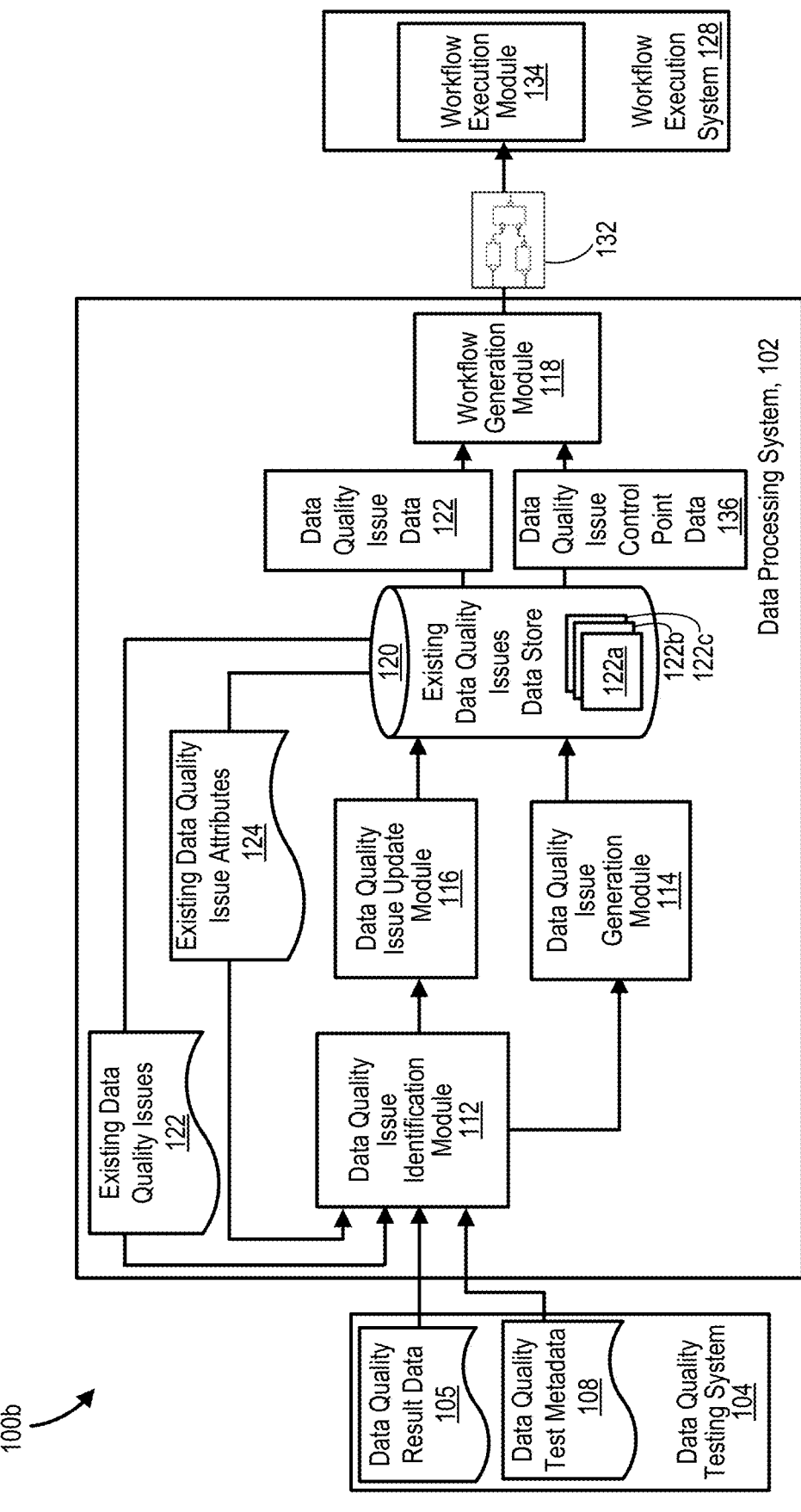

FIG. 1B shows a block diagram of an environment 100b of the data processing system 102 of FIG. 1A, including additional details for processing data quality results 105. As previously described, the data processing system 102 is configured to receive data quality results 105 from the data quality testing system 104. The data processing system 102 generates or updates data quality issues representing data quality tests that were failed by the tested data. The data quality issues 130 are stored in a data store 120 with associated attributes 124. The workflow generation module 118 uses the attributes and configured data quality issue 122 to generate workflows 132. The workflows 132 include executable logic that can be sent to a remote device, such as a workflow execution system 128 (e.g., a client device). The workflow execution system 128 executes the logic of the workflow 132 using an execution module 134. The execution module 134 can include an application layer that enables a user to manipulate the workflow 132, data quality issue 122, or attributes 124 (e.g., through a user interface).

The data quality testing system 104 includes a device or system configured to receive datasets (not shown) and apply data quality tests to those datasets. The datasets can include any data having data quality standards. The data quality testing system 104 generally tests the datasets by applying one or more data quality rules to the datasets. Generally, the data quality test is configured based on metadata 108 (e.g., attributes) of a control point. The control point is used to configure the data quality test. Attributes of the control point specify how the data quality test is to be performed (e.g., which rules), when the data quality is scheduled, what the target data of the data quality are, and so forth, as subsequently described.

The data quality rules include logic indicating a standard for value(s) of the records. Generally, the particular data quality rule(s) applied to a dataset depend on an indication of a desired data quality for the dataset. In some implementations, the indication can be based on the source of the dataset. For example, the source of the dataset can be associated with data quality metadata 108 specifying what data quality rules are to be applied for data from that source. The metadata 108 can be associated with a data quality control point 136 that scheduled the data quality test. In another example, the data quality rules being applied can depend on the particular semantic type of data being analyzed. A semantic type is a meaning of the data. For example, a semantic type can be an address, birth date (not merely just any date), driver's license identifier, or other specific meaning of the data. For example, a particular set of data quality rules can be applied to a birth date that would not be applied to a credit card expiration date. The semantic type can also refer to a language type of the data (e.g., French, English UK, American English, and so forth) which may impose different format requirements on the data. For example, a date format might change for English UK data (e.g., day/month/year) when compared with American English (e.g., month, day, year). These attributes can be used to select which data quality rules are applied to the data. In some implementations, as subsequently described, the data quality issue may indicate that the wrong rules were applied to a given dataset, causing the data quality test to fail.

The data quality test metadata 108 can indicate which attributes were used to select one or more data quality rules for the datasets. The data quality test metadata 108 can be obtained from the control point 136 associated with a particular data quality test. The control point 136 includes the values of attributes that specify how the data quality test is to be performed. For example, a particular attribute may indicate one or more rules that can apply to a selected field or data record of a dataset. In this context, the attributes can indicate sets or ranges of allowed values, relationships of the values of the field to values of one or more other fields (e.g., always greater than, always less than, equal to, a function of, and so forth), data type, expected value length, or other characteristics of the values of a field. For example, as subsequently described, the attributes can indicate what values are permitted in a field and what values are not permitted in the field or data record. For example, a given range indicated in the attributes associated with a label of a field can also be a data quality rule for that field. However, the attributes associated with the field and the rules being generated for the field do not necessarily match. For example, a data quality rule for the field can require that there are no duplicative values or no empty values, while the attributes need not indicate this rule. Conversely, the attributes may indicate that the selected field conform to a particular requirement, but the data quality rules being generated need not enforce this requirement.

Any number of data quality rules can be selected using any combination of the attributes. The rules can enforce a requirement for each value of the field independently from any other fields or values of the dataset. For example, a data quality rule can require that a format of a value of the field associated with a Social Security Number field has a format "XXX-XX-XXXX," where X can be any digit from 0-9. This requirement is based on each individual value and requires no further analysis to enforce. In another example, the data quality rule can check the type of each character in the value, ensuring that all the X values are indeed digits from 0-9, rather than other characters. In another example, the data quality rule can require a check on the entire selected field. For example, data quality rule requires that each value in the selected field be unique. This requires checking the values in the selected field in addition to the currently processed value to determine whether each value is unique.

Other examples of data quality rules are possible. In some examples, a rule to be used to characterize the quality of a set of data can indicate an allowable value or a prohibited value for data records in the dataset. The allowable value can be a single value or range of values. A rule indicating an allowable value is satisfied when the profile includes an allowable value. An example of an allowable value for a field can be allowable maximum and minimum values for that field; if the average value for the field falls between the allowable maximum and minimum values, the rule is satisfied. A rule indicating a prohibited value for a dataset is satisfied as long as the dataset does not include the prohibited value. An example of a prohibited attribute for a field can be a list of values that are prohibited for that field; if the field includes any of the prohibited values, the rule is not satisfied.

A data quality rule can indicate an allowable deviation between a value or values of a field and a specified value for the field. A deviation between the specified value and the values of the field that is greater than the allowable deviation indicated by the corresponding rule can be an indication of a data quality issue in the dataset, and thus an indication that the dataset is a possible root cause of an existing or potential data quality issue in a downstream set of data. In some examples, the allowable deviation can be specified as a range of values, such as a maximum allowable value and a minimum allowable value. In some examples, the allowable deviation can be specified as a standard deviation from a single value, which can be an average value (e.g., a mean or median of values in past datasets).

In some examples, a rule to be used to characterize the quality of a set of data can indicate allowed or prohibited characteristics of the value in each of one or more fields of a data record, such as based on the validity of the value in a field. A rule indicating an allowed characteristic for a field is satisfied when the value in the field meets the allowed characteristic. A rule indicating a prohibited characteristic for a field is satisfied as long as the value in the field does not meet the prohibited characteristic. A value that satisfies a rule is sometimes referred to as a valid value; a value that does not satisfy a rule is sometimes referred to as an invalid value. Various characteristics of values in the fields can be indicated as allowed or prohibited characteristics by the rule. An example rule can indicate allowed or prohibited characteristics of the content of a field, such as an allowed or prohibited range of values, an allowable maximum value, an allowable minimum value, or a list of one or more particular values that are allowed or prohibited. For instance, a birth year field having a value less than 1900 or greater than the present year may be considered invalid. An example rule can indicate allowed or prohibited characteristics of the data type of a field. An example rule can indicate a whether the absence of a value (or the presence of a NULL) in a certain field is allowed or prohibited. For instance, a last name field including a string value (e.g., "Smith") may be considered valid, while a last name field that is blank or that includes a numerical value may be considered invalid. An example rule can indicate an allowed or prohibited relationship among two or more fields in the same data record. For instance, a rule may specify a list of values for a ZIP field that correspond to each possible value for a state field and may specify that any combination of values for the ZIP and state fields that is not supported by the list is invalid.

In some examples, a rule can be selected based on an analysis of historical data. For instance, a rule can be indicative of an allowable deviation between a profile of a field of a particular set of data and a determined historical profile of the field of the set of data. The historical profile for a dataset can be based on historical data; for instance, the historical profile can be a profile of the same dataset from a previous day, an average profile of the same dataset from multiple previous days (e.g., over the past week or month), a lifetime average profile of the same dataset. More generally, the profile can retain a wide variety of reference information to take advantage of various kinds of statistical analyses. For example, the profile can include information about standard deviations or other indications of a distribution of values. For purposes of the examples below, and without limiting the generality of this application, the profile can include a numerical average of prior datasets, and possibly also a standard deviation.

In some examples, machine learning techniques are employed to select the data quality rules. For instance, data can be analyzed over a learning period in order for user preferences or applications as to which characteristics affect the data quality for that application and thus require data quality rules for enforcement of those characteristics. For example, if an application often fails because values of the field are in an incorrect format, the rule generation module generates a rule to enforce a particular format. If the application fails because numerical values are out of an acceptable range, the rule generation module 206 generates a data quality rule to enforce a particular range of values for the field. Other such examples are possible. The learning period can be a specified period of time or can be an amount of time until an average or expected value converges to a stable value. The machine learning logic can be configured by the control point 136.

The data quality testing system 104 can apply one or more data quality rules based on expected characteristics of data records to be processed by the system. In a specific example, the source data are credit card transaction records for transactions occurring in the United States. The source data are streaming data that are processed in one-hour increments. Based on attributes identified for the field, and data from an application indicating operations to be performed when processing the credit card transaction records, the user can identify the transaction identifier field, the card identifier field, the state field, the date field, and the amount field as critical data elements to be profiled.

In the specific example in which the source data are credit card transaction records, the data quality testing system 104 receives attributes indicating that there are only fifty allowable values for the state field. The data quality testing system 104 can select a rule that causes an alert flag to be used if the profile of the set of source data identifies more than fifty values in the state field, regardless of the standard deviation of the profile of the set of source data relative to the reference. The data quality testing system 104 can receive an attribute indicating that only credit card transaction records for transactions completed on the same day as the processing should be present in the set of source data. The data quality testing system 104 can create a rule that causes an alert message to be sent if any source data record has a date that does not match the date of the processing.

In some examples, the data quality testing system 104 can specify one or more rules being generated through a user interface. Through the user interface, a user can provide feedback for a rule for one or more fields or can approve a pre-populated default rule for a field. Further description of a user interface can be found in U.S. application Ser. No. 13/653,995, filed Oct. 17, 2012, the contents of which are incorporated here by reference in their entirety. Other implementations of the user interface are also possible.

In some examples, if a possible data quality issue is detected in a set of data, such as in a new version of a set of reference data or in a set of source data, an identifier of the set of data having the possible data quality issue is placed on a list of root cause datasets stored in a database. If a data quality issue with a set of output data is later detected, the database can be queried to identify the upstream data lineage elements for the set of output data and to determine which, if any, of those upstream data lineage elements are included on the list of root cause datasets.

In some examples, if a possible data quality issue is detected in a set of data, such as a new version of a set of reference data or in a set of source data, a user notification can be enabled. In some examples, an alert flag can be stored to indicate the data quality issue. For instance, if a possible data quality issue is detected in a new version of a set of reference data, an alert flag can be stored in conjunction with the profile data for the new version of the reference data. If a possible data quality issue is detected in the set of source data, an alert flag can be stored in conjunction with the profile data for that set of source data. In some examples, an alert message can be communicated to a user to indicate the existence of a possible data quality issue. The alert message can be, for instance, as a message, an icon, or a pop-up window on a user interface; as an email or short message service (SMS) message; or in another form. These data can be a part of the data quality issue attributes 124 stored in the data store 120.

In some examples, the rules can specify actions for the data processing workflow 132 to be performed in response to how the data quality rules are not satisfied. For example, one or more threshold deviations from a data quality profile can be specified in the data quality test metadata 108. The threshold deviations may indicate when an alert flag or alert message is used in the workflow 132, an entity to which the data quality issue 122 is assigned, a data quarantine procedure, and so forth. For instance, if the deviation between a profile of a current set of data and a profile for that set of data is small, such as between one and two standard deviations, the alert flag can be stored; and if the deviation is greater than two standard deviations, the alert message can be communicated and the data quarantined. The threshold deviation can be specific to each set of source data and reference data.

In some examples, such as if the deviation is severe, e.g., more than three standard deviations from the profile, further processing by a related processing system using the data can be stopped until a user intervenes. For instance, any further processing that will be affected by the source data or reference data having the severe deviation is halted. The transforms to be halted can be identified by the data that references the data lineage elements that are downstream of the affected source or reference data.

In some examples, the profile data are automatically determined. For instance, the profile data for a given set of data can be automatically updated as a running historical average of past profile data for that set of data, e.g., by recalculating the profile data whenever new profile data for that set of data are determined. In some examples, a user can supply initial profile data, e.g., by profiling a set of data having desired characteristics.

The data quality testing system 104 applies the selected data quality rules and generates data quality results data 105. The data quality results data 105 indicate whether values of the analyzed datasets satisfied the applied data quality rules. The data quality test metadata 108 associated with the results data 105 include data describing the dataset, the data quality test performed. For example, the test metadata 108 can include identifications of which rules were applied to which portions of the dataset, when the data quality test was performed, an owner of the dataset, and so forth.

In some implementations, the data quality testing system 104 is configured to perform data quality testing and send the results data 105 to the data processing system 102 in bulk analysis rather than a data stream. For example, the data quality testing system 104 can generate results data 105 for the entire dataset before sending to the data processing system 102 for data quality issue generation and workflow generation. Generally, the results data 105 indicates whether data quality test(s) were failed for one or more portions of the dataset.

The data processing system 102 receives the results data 105 and the test metadata 108 from the data quality testing system 104 and determines whether the result data 105 is such that a data quality issue should be generated. As previously described, the data processing system 102 can generate a data quality issue identifying the failed test if the failure is severe enough to satisfy a condition for generation of a data quality issue. For example, a data quality issue is generated by the data processing system 102 if a threshold percentage of the data of the dataset does not satisfy an applied data quality rule or rules. In some implementations, the dataset can be required to perfectly satisfy all data quality requirements. In some implementations, one or more portions of the dataset can be ignored such that data quality failure of any magnitude does not result in generation of a corresponding data quality issue by the data processing system 102.

The data quality issue identification module 112 of the data processing system 100 is configured to identify, for a given data quality test, a potential data quality issue for generation for the data quality test. The data quality issue specifies the results data of the data quality test, the source of the tested data, and details of how the data quality test was not satisfied, such as one or more data quality thresholds that were not satisfied during the test for particular fields or records of the dataset. The data quality issue identification module 112 analyzes the values of the test metadata 108 associated with the data quality test results 105. The test metadata 108 values are compared to attributes 124 associated with one or more existing data quality issues 122, as subsequently described in further detail with respect to FIG. 2A. When the comparison of the test metadata 108 to the attribute 124 values indicates a match of the detected data quality issue with an existing data quality issue 122, the existing data quality issue 122 is updated using the new results data 105 and test metadata by the data quality update module 116, as described in relation to FIG. 2C. If no existing data quality issue is found, the data quality issue generation module 114 generates a new data quality issue using the test metadata 108 and the results data 105, as described in relation to FIG. 2B. The generated or updated data quality issue data 130 are stored in the data store 120 as data quality issues 122*a-n*.

To generate a workflow, the workflow generation module 118 receives the data quality issue data 130 from the data store 120 and any associated data objects, such as a data quality issue control point 136, which also include their respective attributes 124. The workflow generation module 118 applies a set of configured rules to the data quality issues 122. The rules are generally configured in advance of processing. The rules specify how to process the data quality issue 122 based on the values of its attributes and its associated data objects (e.g., control point 136). For example, a particular user may be selected for assignment as the responsible entity for a particular severity of a data quality issue or for data quality issues for data from a particular source. In some implementations, the rules can specify actions to be taken automatically in the workflow 132 based on the data quality issue 122. For example, if a data quality issue is reoccurring, the responsible entity can be changed or elevated to an entity different from a current or prior assigned entity. In another example, the state associated with the data quality issue is referenced to determine which action(s) are included in the data processing workflow 132.

The generated workflow 132 is sent to a workflow execution system 128 configured to execute the one or more actions of the workflow. In some implementations, a workflow execution module 134 executes logic for the workflow. The logic can include handling the data quality issue automatically, such as redefining a data quality rule based on a predetermined criteria, quarantining the dataset from other devices and systems in a networked system (e.g., other devices than the source of the dataset), deleting portions of the dataset, sending alerts to one or more responsible entities or related entities, activating one or more computing applications (e.g., a data masking application), or causing other data processing actions to occur.

In some implementations, execution of the workflow 132 includes one or more actions requesting input from a responsible entity (e.g., a user or administrator), such as requesting approval for performing an action on the dataset or changing a rule definition, suggesting one or more rules that should be changed, displaying reports, showing timelines related to resolving the data quality issue 122, displaying or updating a state of the data quality issue, displaying a presentation of responsible entities, generating and presenting alerts to the responsible entity, or suggesting one or more other actions for resolution of the data quality issue.

Once the workflow 132 is executed, a check is performed to determine whether data quality issue 122 is resolved. The check may include holding the data quality issue 122 in an unresolved state until subsequent results data 105 indicate that the data quality issue is no longer present for that data set. In some implementations, a user can affirmatively indicate that the data quality issue 122 is resolved. In some implementations, completion of the workflow is an indication that the data quality issue 122 is resolved. If it cannot be determined (e.g., either automatically or after human verification is requested) that a data quality issue 122 has been resolved, the data quality issue is kept active and stored in the data store 120. The data quality issue 122 can eventually expire (e.g., if it is not updated for a set period of time). When the data quality issue 122 expires, it is removed from the data quality data store 120.

Figure 2A:
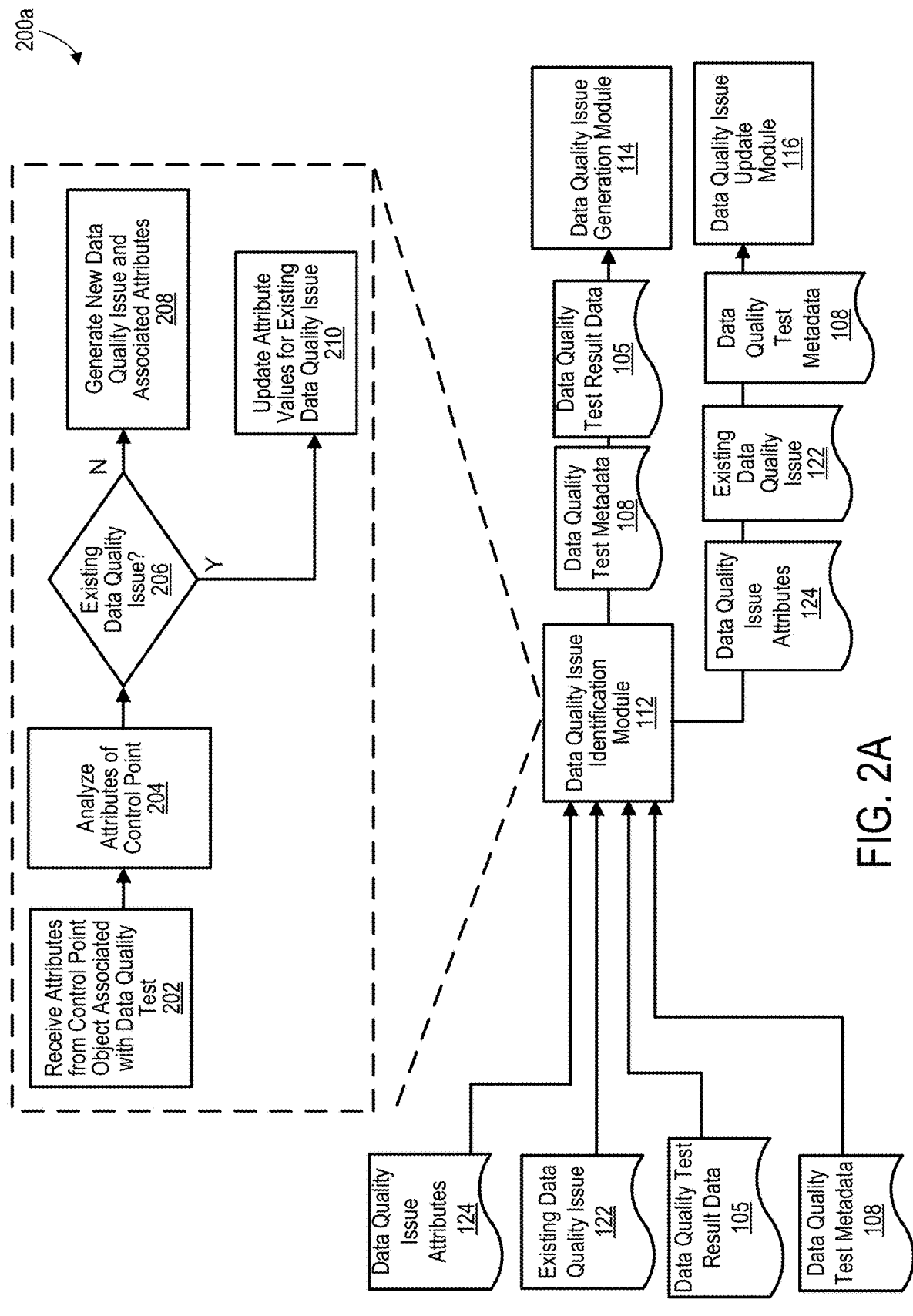

FIGS. 2A-2D show examples of data processing actions of the modules 112, 114, 166, and 118, respectively, of the data processing system 100 of FIGS. 1A-1B. FIG. 2A includes a process 200a for the data processing system 100 for identifying data quality issues from the data quality results data 105 and the data quality test metadata 108.

Figure 2B:
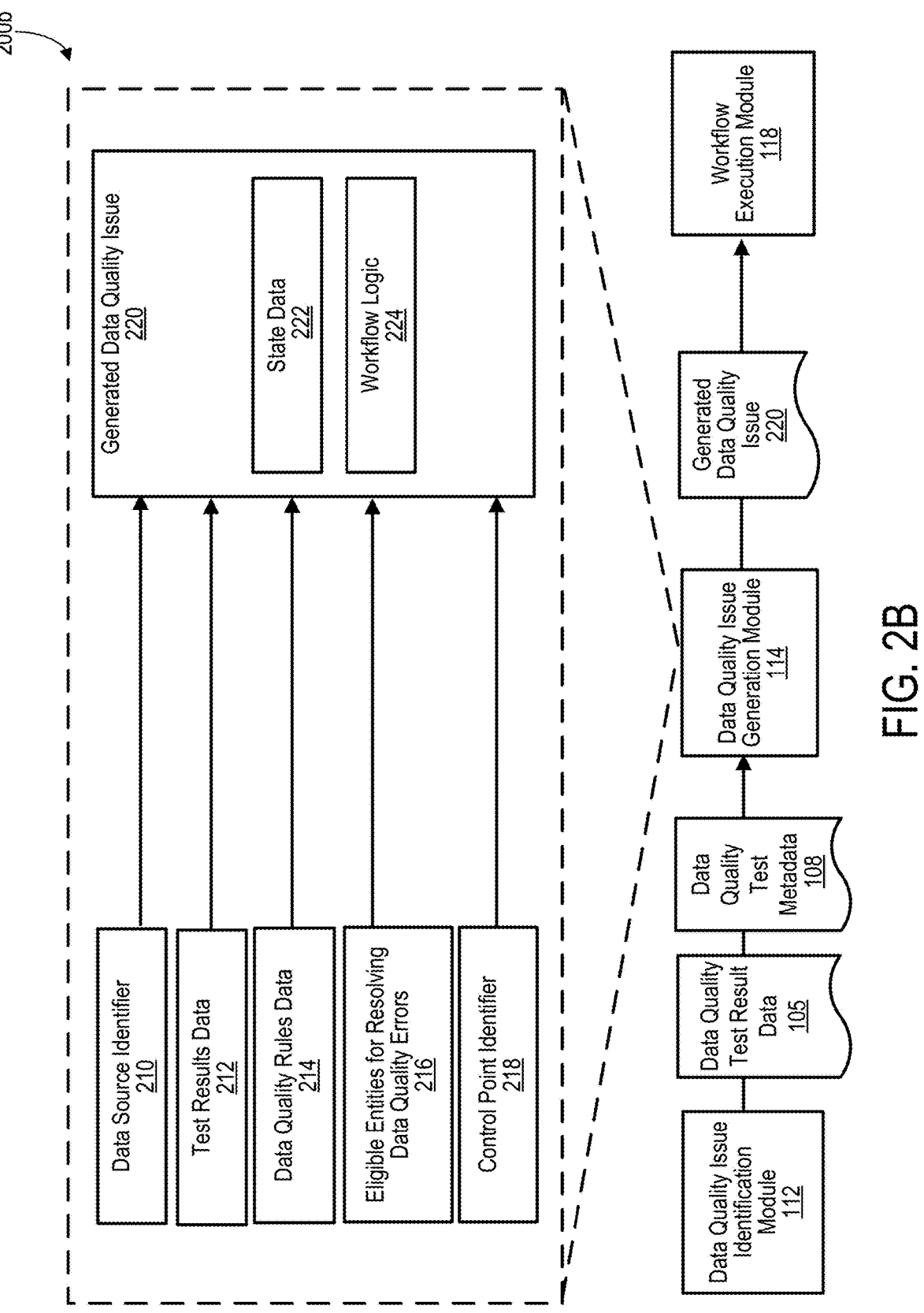

The data quality issue identification module 112 is configured to determine whether a new data quality issue is represented in the test results data 105 or whether one or more existing data quality issues are represented in the test results data. Generally, the control point 136 associated with the data quality test that was performed specifies whether a data quality issue exists for that particular data quality test (e.g., the one or more rules tested on the particular field(s) of the data quality test). When a new data quality issue is identified, the data quality test metadata 108 and data quality results data are sent to the data quality issue generation module 114 for generation of a new data quality issue with attribute values populated using values from the test metadata. The process for generating a new data quality issue is shown in FIG. 2B. When an existing data quality issue 122 is identified, the data quality issue identification module 112 sends the data quality issue attributes 124 for the existing data quality issue 122, the existing data quality issue data, the data quality test result data 105, and the data quality test result metadata 108 to the data quality issue update module 116. The data quality issue update module updates the existing data quality issue using the values of the test metadata 108 and the test results in the context of the attributes 124 that are already populated for the existing data quality issue 122. The process for updating an existing data quality issue 122 is described in relation to FIG. 2C.

The data quality issue identification module receives (202) attributes from a data quality control point 136 that is associated with the data quality test. The data quality control point 136 includes a data object including attributes that configure the data quality test, as previously described. The data quality issue identification module 112 analyzes (204) the attributes of the data quality control point 136 to determine whether there is an existing data quality issue 122 in the data store 120. The control point 136 includes an identifier (as subsequently described). The identifier associates the control point 136 with an existing data quality issue, if one exists. If a data quality issue already exists, the data quality identification module is configured to initiate a process to update (210) the attribute values for the existing data quality issue with the metadata 108 from the data quality test. If no data quality issue already exists, the data quality issue identification module 112 is configured to initiate a process to generate (208) a new data quality issue and populate the attributes of the generated data quality issue with values from the metadata 108 of the data quality test.

Each of the existing data quality issues 122a-c are each associated with respective attributes 124 having values populated based on prior result data and processing in associated workflows. For example, an existing data quality issue 122 can be associated with a state value that indicates how a related workflow is executing for that data quality issue. For example, the state can indicate that the existing data quality issue 122 is new, in a triage analysis, is published (e.g., to the data store 120), is in progress of being resolved by a responsible entity, is resolved, or is unresolved. The state generally indicates the status of the workflow for that data quality issue. The existing data quality issue 122 is associated with other attributes including an owner of the dataset represented in the data quality issue, a responsible entity for resolving the data quality issue, a timeline of events for resolution of the data quality issue, time stamp data, a data quality score for the data representing in the issue, and so forth as previously described.

In an embodiment, a data quality issue from the data quality test can be matched to a stored data quality issue in the data store 120. In this example, the data quality issue identification module 112 is configured to analyze the attribute values of the existing data quality issues 122a-n with values in the test metadata 108 and the test results data 105. The comparison includes matching values for one or more of the attribute values, such as key values, field names, data source names, or other similar attributes that identify the data quality issue. In some implementations, the data quality results 105 includes an identifier that can be stored with the data quality issue as an attribute value. When subsequent data quality tests are performed, the same identifier can be referenced. If values of the attributes 124 match the test metadata 108 or are similar within a threshold similarity, the data quality issue identification module 112 determines that the results data 105 corresponds to an existing data quality issue. The existing data quality issue 122 is updated based on the attribute values 124 of the existing data quality issue and also based on the test metadata 108 and test results 105. If values of the attributes 124 do not match the metadata 108 of the data quality test, the data quality identification engine 112 determines that a new data quality issue should be generated and populated with attribute values based on the metadata 108 and test results 105.

FIG. 2B shows a process 200b for generating a new data quality issue by the data quality issue generation module 114. The data quality issue generation module 114 is configured to populate a data quality issue with attribute values from the metadata 108 and results 105 of the data quality test if no data quality issue is identified by the data quality identification module 112. As previously discussed, the data quality issue 122 includes a data object or data structure storing attributes that are populated with values. The attribute values are populated automatically using a configurable set of attribute inheritance rules. The attribute inheritance rules are preconfigured rules. The attribute inheritance rules specify which attributes of the data quality issue are automatically populated and sources for the values for those attributes. The source attributes can either be specified in the data quality control point 136 that is associated with the data quality issue or on another object that is directly or indirectly associated with the data quality control point. The source is specified by a source attribute specifier field in a rule set. An example of source attribute specifiers is shown in Table 1, below:

TABLE 1

| Example Attribute Inheritance Rules | | |
| --- | --- | --- |
| TargetAttributeSymbolName | Precedence | SourceAttributeSpecifier |
| xDQOwner | 1 | DQControlPoint.ControlledAsset.BizTerm.xRiskDataDomain.xBusinessOwner |
| xDQDataOwner | 1 | DQControlPoint.ControlledAsset.BizTerm.xRiskDataDomain.xBusinessOwner |
| xDQDataSteward | 1 | DQControlPoint.DQRule.BizTerm.xSteward |
| xDQRuleOwner | 1 | DQControlPoint.DQRule.BizTerm.xBusinessOwner |
| xDQRuleSteward | 1 | DQControlPoint.DQRule.BizTerm.xSteward |
| IssueListeners | 1 | DQControlPoint.ControlledAsset.BizTerm.xRiskDataDomain.xBusinessOwner |
| IssueListeners | 1 | DQControlPoint.DQRule.BizTerm.xBusinessOwner |

For example, the first rule in Table 1 indicates that a value for Data Quality owner for the data quality issue being generated is soured from the Business Owner attribute in the Risk Data Domain of the Biz Term associated with a Controlled Asset that is controlled by the data quality control point 136. This rule references four data objects associated with the data quality issue to find the value for the attribute. The value of the attribute is used to populate an attribute of the data quality issue. In Table 1, a precedence is a priority value for the attribute source. Higher priority sources are used to populate attribute values before lower priority sources. The attribute inheritance rules populate attributes of the data quality issue including an owner of the data quality issue, identification of data quality rules being tested, description or comment data, data and time metadata, time-line data, and so forth as subsequently described in relation to FIGS. 6A and 6B.

Continuing with FIG. 2B, the data quality issue generation module 114 generates a data object including the data quality issue 220. The data quality issue 220 includes attributes with values populated from the data quality test result data 105, and the data quality test metadata 108. The data quality issue 220 receives values from the metadata 108 and the data quality test results data 105 that specify one or more of the following values. An identifier 210 that specifies a source of the data being tested by the data quality rules can be received. The identifier can cause a source name to be populated in the data quality issue 220. The generated data quality issue 220 can include at least a portion of the test results data 212. The test results data 212 include either the actual results for a given field being tested (such as an indication of a pass or fail for each value in a particular field) or a summary of the data quality test result (e.g., a percent-age of values in a field passed or failed, etc.).

The generated data quality issue 220 can include data quality rules data 214. The data quality rules data includes a definition of the particular data quality rules or logic are being applied to the selected records or fields for the data quality test. The data quality rules data 214 can specify a single rule or a set of rules for a data quality test. These rules together constitute a data quality test. For example, a data quality test can include requirements that a field value be populated with exactly 7 characters and that the characters are all numerical digits. If either rule fails, the data quality test fails. In some implementations, the results data 212 specify how the data quality test failed (e.g., which data quality condition was not met). In some implementations, the data quality results data 212 specify that at least one data quality condition was not satisfied.

The generated data quality issue 220 can inherit a list of eligible entities for resolving data quality errors. The entities can include systems, devices, or users that are assigned responsibility for resolving the errors in the tested data that cause the data quality issue. Eligible entities can be based on preconfigured logic. For example, a particular group of entities can be eligible for newly generated data quality issues 220. A particular group of entities can be eligible for resolving data quality issues for data owned by a particular owner or set of owners. Eligible entities can include only automated systems and devices for a first type of data quality rule being tested, but can include only system users or administrators for manual review of other types of data quality rules being tested. Other similar examples are pos-sible. One or more entities are selected from the eligible entities 216 for handling the data quality issue 220. This selection can be a part of the generated workflow 132 and can be based on logic of that workflow.

The generated data quality issue 220 can receive attribute values from related data objects, such as a control point identifier 218. The related data objects can provide one or more values of attributes that are stored by those data objects.

The generated data quality issue 220 is populated based on data from at least the sources described above. The data quality issue generation module 114 assigns a state value 222 to the data quality issue 220. The state data 222 indicates a state of workflow execution (e.g., by an associated work-flow 132) for processing the data quality issue 220. For example, the data quality issue can be assigned a "new issue" state, an "in triage" state, a "published" state, a "completed" state, or one or more other states. In an example, a data quality issue can be escalated if reoccurring. Because data quality issue 220 is newly generated, the initial state of "new data quality issue" is assigned to the data quality issue.

Once the new data quality issue 220 is generated, the data quality issue data are sent to the workflow execution module 118. In some implementations, the data quality issue data are stored in the data store 120. The workflow execution module 118 generates a workflow 132 for execution based on the attribute values of the data quality issue. The workflow 132 is generated based on the workflow logic 224 of the data quality issue 220. The workflow logic 224 indicates pro-cessing logic or actions for resolving the data quality issue 220. For example, the workflow logic indicates an entity that is assigned to resolve the data quality issue 220. The workflow logic 224 indicates steps or options for data quarantining. The workflow logic includes guidance for debugging the data quality rule or identifying a source of the low quality data.

Figure 2C:
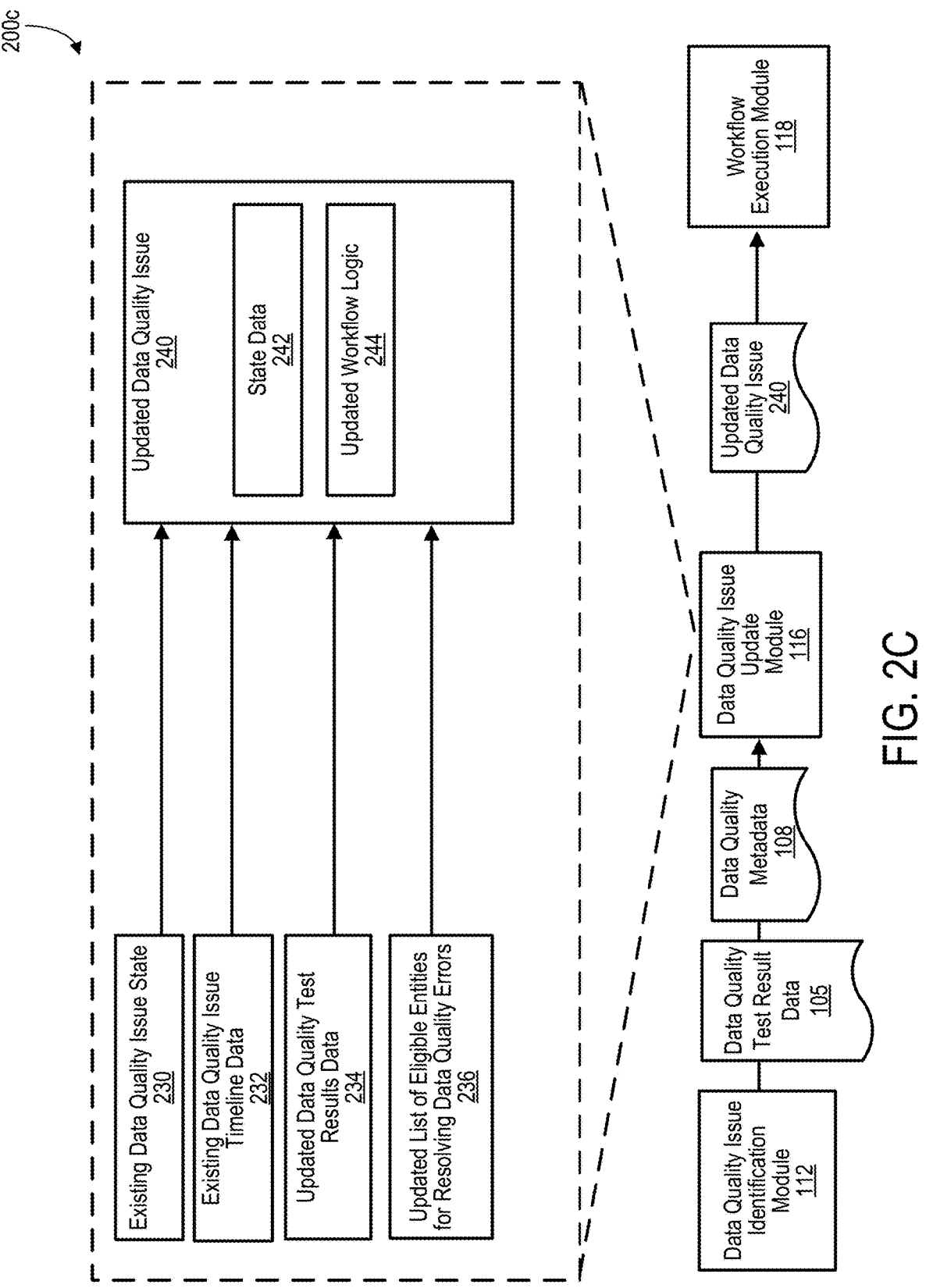

FIG. 2C shows a process 200c for updating an existing data quality issue 240 based on results data from a data quality test. The process for updating a data quality issue 240 is similar to generation of a new data quality issue, except not all attributes of the existing data quality issue are populated from the control point or other data objects.

Rather, only attributes reflecting the recent data quality test are updated based on the results data 105 of that data quality test and its metadata 108.

Once the data quality issue is identified by the data quality issue identification module 112, the existing data quality issue 240 is updated with data from the most recent data quality test configured by the control point specifying that data quality issue. A state 230 of the existing data quality issue is identified. In some implementations, the state is updated to indicate that a second data quality test has identified a reoccurring data quality issue. The updated state changes which actions are performed by the workflow 132 or whether the workflow 132 is updated in response to the new test.

The existing data quality issue 240 is updated with timeline data 232. Timeline data 232 include a sequence of one or more actions or operations that are performed in association with the data quality issue 240. For example, the actions include scheduled or executed data quality tests. Each data quality test that has been performed are associated with respective results data in the timeline of the data quality issue 240. This allows a user or entity to quickly review trends for reoccurring data quality issues to determine if any changes made to the data quality test or to the tested data have improved the results. For example, if a number of records or entries of a field that have passed a data quality test increase over time, the user determines that the data are being improved to eliminate the data quality issue. The timeline indicates when changes are made to one or more data quality rules (e.g., by an assigned entity) or to the tested data. The indication of a change or update may be linked to the respective version of the rule or tested data. In some implementations, the indication of a change assists an entity for determining whether the changes being made to the tested data or the data quality rules are improving the data quality results or exacerbating the data quality issue.

The existing data quality issue 240 is updated with updated data quality test results data 234. The updated data quality test results data 234 indicate how the tested data performed for the most recent data quality test. The updated test results data 234 are included in the timeline of the updated data quality issue 240 or otherwise indicated in the data quality issue. The entity that is responsible for resolving the data quality issue 240 reviews the updated results data 234 and determine if the reoccurring data quality issue 240 is improved or worsened with respect to the previous data quality test.

The updated data quality issue 240 includes an updated list of eligible entities for resolving the data quality errors causing the data quality issue. The eligible entities are based on a state of the data quality issue 240, based on a type of data quality error shown in the data quality test results data 234, or based on one or other metrics. For example, the list of eligible entities is based on an owner or source of the tested data. The list of eligible entities is updated for each data quality test to ensure that an eligible entity is assigned (or reassigned) responsibility for resolving the data quality issue 240.

The updated data quality issue 240 receives metadata or attribute values from one or more other objects associated with the data quality test, such as from the control point that configured the data quality test. The updated data quality issue 240 therefore includes data that describes the most recent data quality test that caused reoccurrence of the data quality issue and also data from prior data quality tests that caused the data quality issue to occur. The result is a data quality issue 240 that includes trend data from prior occurrences, which assists an assigned entity with debugging the data quality rules, eliminating data having low quality from the associated system, or identifying a source of low quality data. A source of low quality data includes a particular data source (e.g., an application, database, etc. that produces low quality data), but also can include a poorly defined data quality test. The data from each occurrence of a reoccurring data quality issue are associated so that the entity determines how the source of low quality data is causing the low quality data. The previous and current data for the data quality issue 240 assists the entity to remedy the problem, such as by restricting data from the low quality data source, altering a definition of a data quality rule, quarantining low quality data, adjusting logic of an application or data processing workflow, or taking some other remedial action.

The data quality issue 240 is associated with state data 242. The state data 242 indicates a state of the workflow for processing the data quality issue 240. The state of the data quality issue 240 is similar to the state 222 of the data quality issue 220 as previously described.

The data quality issue 240 is associated with updated workflow logic 244. The workflow logic 244 indicates processing logic or actions for resolving the data quality issue 240. For example, the workflow logic indicates an entity that is assigned to resolve the data quality issue 240. The workflow logic 244 indicates steps or options for data quarantining. The workflow logic includes guidance for debugging the data quality rule or identifying a source of the low quality data. In some implementations, some or all of the workflow actions are performed automatically. In some implementations, the actions of the workflow are suggestions presented to the responsible entity, once assigned. In some implementations, the workflow logic specifies a configuration of a user interface for presenting the data quality issue 240 to a user, such as an assigned entity.

The data including the updated data quality issue 240 are sent to the workflow execution module 118 for generation of the workflow 132. In some implementations, the update data quality issue 240 data are sent to the data store 120.

Figure 2D:
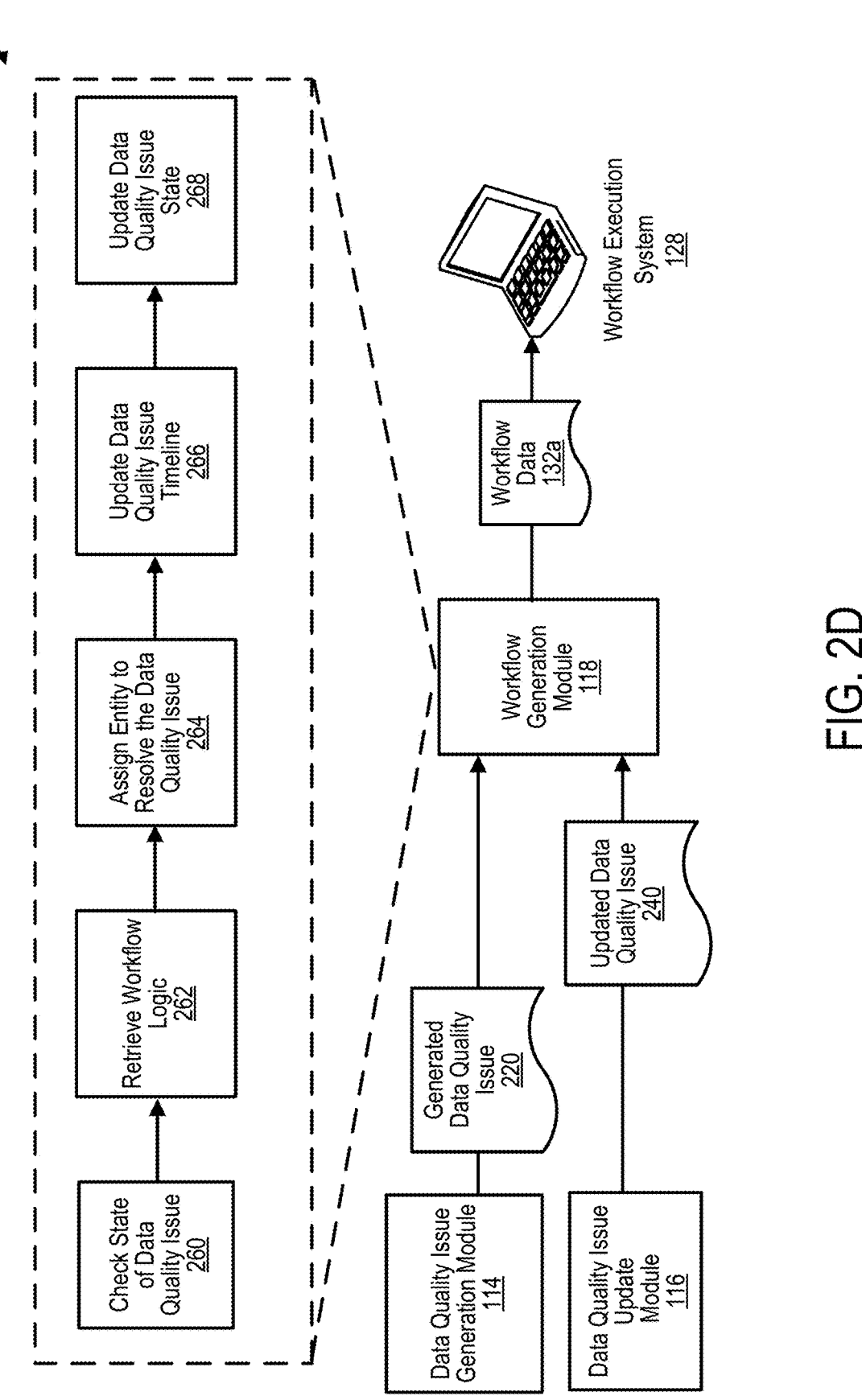

FIG. 2D shows a process 200*d* for generating a workflow 132 (e.g., as workflow data 132*a*) from the new data quality issue 220 or updated data quality issue 240. The process 200*d* is an example and can include additional actions or different actions, depending on the values of the attributes of data quality issues 220, 240. To perform the process 200*d*, the workflow generation module 118 receives the data quality issue data, either from the data quality issue generation module 114 (if a new data quality issue is generated) or from the data quality issue update module (if an existing data quality issue is updated). The workflow generation module 118 is configured to generate a workflow 132 based on the state of the received data quality issue 220, 240 and the values of the attributes of the respective data quality issue. As previously described, the workflow 132 includes logic for resolving the data quality issue. The logic specifies one or more actions to be performed by a workflow execution system 128. The logic of the workflow includes displaying one or more different user interfaces, generating alerts, quarantining data, assigning an entity responsible for resolving the data quality issue, invoking one or more third party services, or other similar actions. The logic of the workflow can be based on preconfigured logic generated by a user (e.g., a system administrator). In this way, the workflow 132 can be application-specific.

The workflow generation module 118 is configured to check (260) the state of the data quality issue 220, 240. If the state specifies a new data quality issue, the workflow generation module 118 generates a new workflow for processing the data quality issue to resolve the data quality issue. If the state specifies an existing data quality issue, the workflow generation module 118 determines whether the workflow associated with the data quality issue 240 should be updated depending on the attribute values of the data quality issue.

The workflow generation module 118 is configured to retrieve (262) workflow logic based on the identified state of the data quality issue. The workflow logic is configured based on requirements of the system. In an example, the workflow logic is configured through a control point. In this example, attribute values of the control point populate the data quality issue. The values of the attributes of the data quality issue are analyzed to determine what the logic of the workflow is for resolving the data quality issue. For example, an existing workflow may be updated with new logic for assigning an entity responsible for resolving the data quality issue if the data quality issue is reoccurring or worsening. In another example, the workflow 132 logic can be changed if a target execution system 128 to execute the workflow (or a portion thereof) is changed, if the owner changes, if the data source changes, and so forth. For example, if the target execution system 128 is a client device, the particular user interface generated, such as for viewing attribute values of the data quality issue by the assigned entity, is adjusted based on the device type.

The workflow generation module 118 is configured to assign (264) an entity to resolve the data quality issue. The entity is assigned based on attribute values in the data quality issue 220, 240. In some implementations, the entity is not actually assigned, but logic for assigning the entity is retrieved and included in the workflow. In some implementations, the entity is assigned so that a target workflow execution system 128 is identified for sending the workflow data 132a. For example, the entity can be the workflow execution system 128 itself or a user thereof.

The workflow generation module 118 is configured to update (266) the data quality issue timeline associated with the data quality issue 220, 240. The data quality issue timeline represents what actions have been taken with respect to that data quality issue, and when those actions are taken.

The workflow generation module 118 is configured to update (268) the state of the data quality issue 220, 240 to indicate that the data quality issue is being processed. In some implementations, the state of the data quality issue is updated after execution of the workflow 132. In this example, the workflow generation module 118 generates the workflow, sends the workflow data 132a to the execution system 128, and receives a response from the execution system indicating that one or more actions of the generate workflow 132 have been executed. In response to this data from the execution system 128, the workflow generation module 118 updates the data quality state.

The generated workflow 132 is sent to the execution system 128 as workflow data 132a. The workflow is executed by the execution system 128, either automatically or in response to user input. The workflow 128 executes the logic selected based on the attributes of the data quality issue. As previously stated, the actual logic is specific to a given application, and is preconfigured by a system administrator.

FIG. 3 shows an example user interface screen 300 representing a user interface for interacting with data quality control points. A list of control points 302a-d is shown. An example representative control point 302a includes an identifier 304, a type 306 (here, all are data quality control objects), a description 308, and an indication of any controlled assets 310. The identifier 304 is a unique code that identifies the data quality control point. The object type 306 distinguishes the control point from one or more other data objects that are associated with the data being tested in the data quality test. The controlled asset 308 specifies the application being tested.

The screen 300 includes a search parameters window 312. Parameters of the window 312 are used to refine the search through the data quality control points. In some implementations, the parameters include filter criteria.

FIG. 4 shows a screen 400 including a user interface that represents a list of data quality issues 402a-h for a system. Each data quality issue 402a-h includes an identifier 406, a state value 408, a related object 410 (e.g., control point) that is specified by its object identifier, a list of one or more assigned entities 414, and workflow data 416, such as time of creation or other timeline data. A control 418 is shown for generating a new data quality issue manually.

The screen 400 includes a search parameters window 404. Parameters of the window 404 are used to refine the search through the data quality issues. In some implementations, the parameters include filter criteria.

Figure 5:
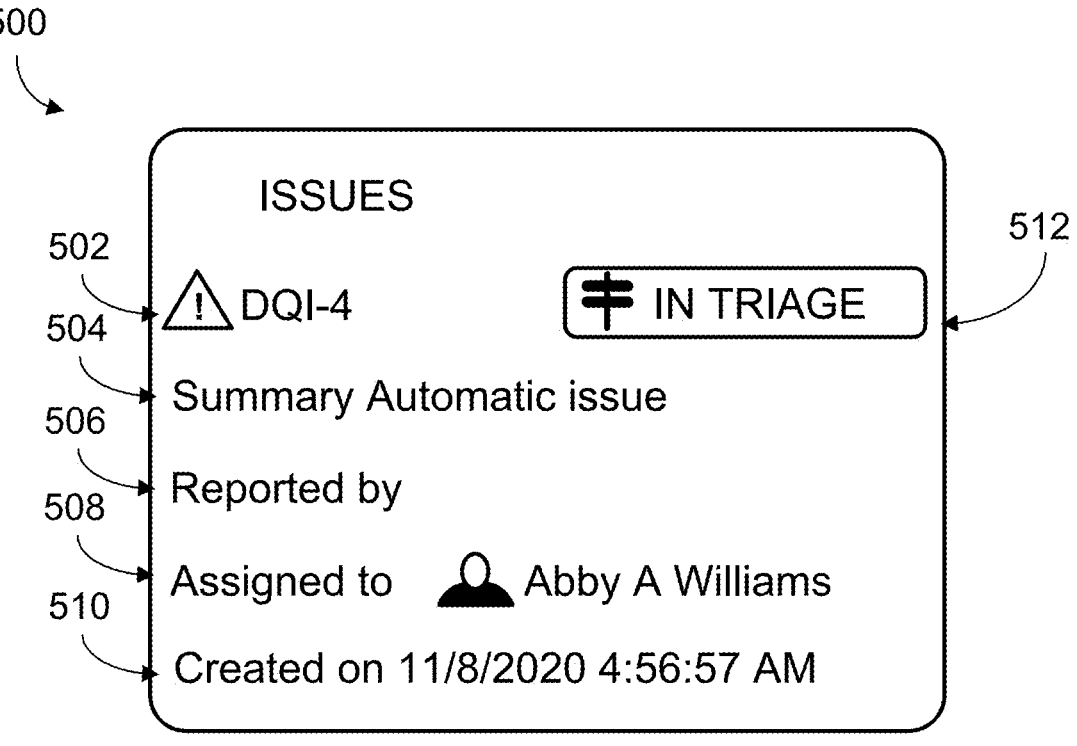

FIG. 5 shows a screen 500 representing a summary of a data quality issue. The screen 500 shows an identifier 502 of the data quality issue. The screen 500 shows summary data 504 for the data quality issue. The screen 500 shows an entity 506 who reported the data quality issue (if applicable). The screen 500 shows an assigned entity 508 for resolving the data quality issue. The screen 500 shows a portion of timeline data 510 for the data quality issue. The screen 500 is generally inset in a larger user interface, but provides a quick summary of a data quality issue by showing some of its attribute values.

Figure 6A:
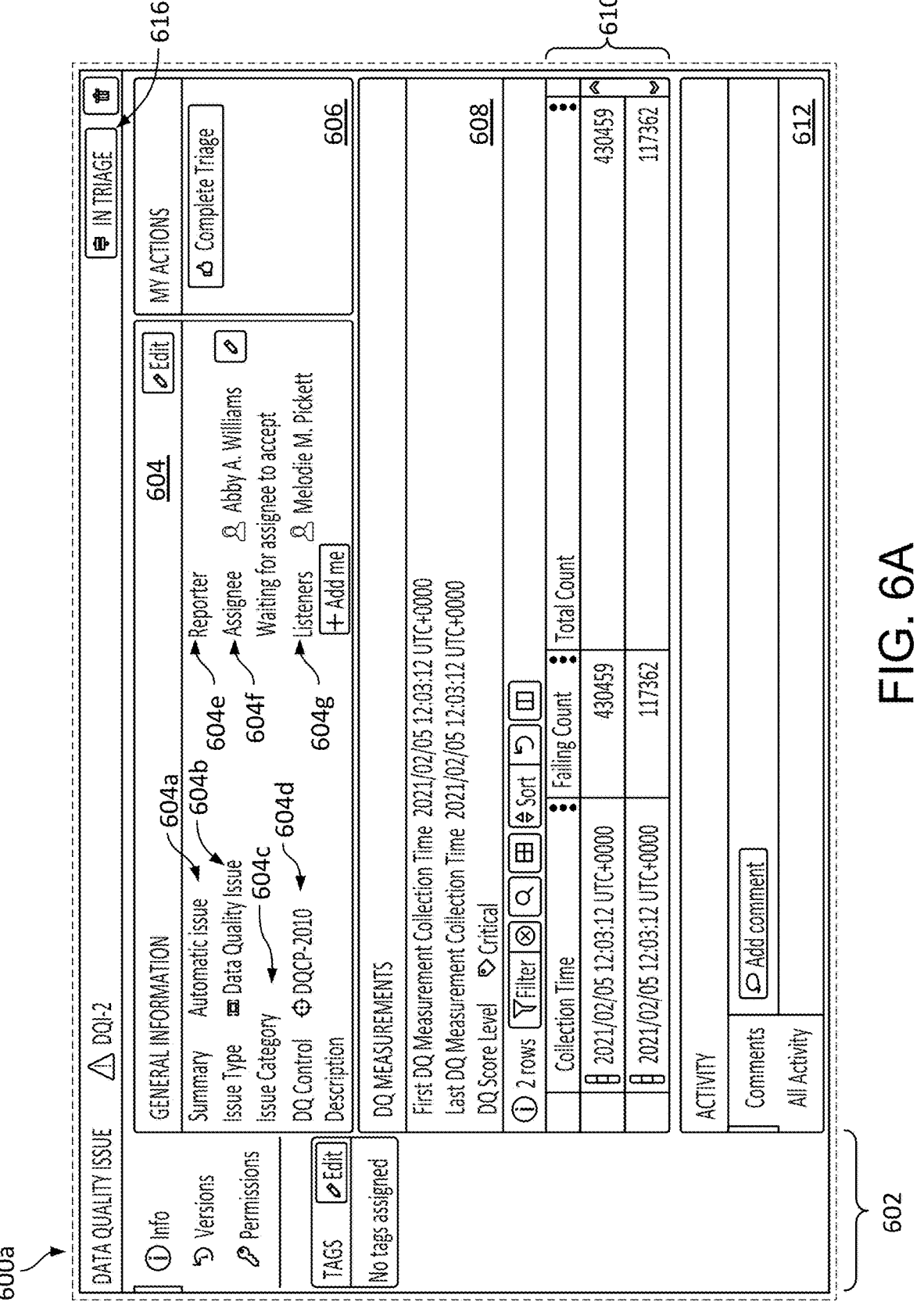

FIG. 6A shows a screen 600a representing data of a data quality issue #2 (called data quality issue DQI-2). The screen 600a shows a more complete view of a data quality, such as the data quality issue of FIG. 5. The screen 600a includes a navigation window 602 that allows a user to access data including the attribute values for the data quality issue, prior versions of the data quality issue (if applicable), and permissions associated with the data quality issue.

The screen 600a includes a general information window 604 that shows the more basic attribute values for the data quality issue. The window 604 shows a summary 604a describing a name of the object, in this case, an automatic data quality issue. The window 604 shows a type 604b of the data quality issue. The window 604 shows a category 604c of the data quality issue. The window 604 shows a control point identifier 604d associated with the data quality issue (e.g., the control that configured the data quality issue). In this example, the control point is DQCP-2010, or data quality control point #2010. The window 604 shows a reporter 604e of the data quality issue (if the data quality issue is manually generated or reported). The window 604 shows an assigned entity 604f for resolving the data quality issue. In this case, the entity is a person called Abbey A. Williams. In other examples, the entity can be a device or system name. The window 604 shows a list of one or more listeners 604g who can observe the data quality issue or receive alerts or other messages based on the workflows associated with the data quality issue. Here, the listener is a person called Melodie M. Pickett. In some implementations, the listener can be a device or system.

Window 606 shows a list of actions recommended for the data quality issue. In an example, the workflow of the data quality issue can prescribe the actions shown in window

606. Here, a "complete triage" action item is shown, as the state 616 of the data quality issue is "in triage."

Window 608 shows data describing data quality measurements for the data quality issue. The timeline data 610 are included in the window 608. The data quality measurement data specify when data quality tests (also called measurements) are performed. The window 608 shows when results data are received. The window 608 shows a portion of the results data for one or more prior data quality tests, if applicable. From the data in window 608, the user can quickly see trends for the data quality issue over time, if the data quality issue is reoccurring.

Window 612 provides a space for additional comments to be provided (e.g., by an assigned entity). The comments may supplement the attribute values inherited into the data quality issue.

The data quality issue shown in screen 600*a* is associated with a state 616. In this example, the data quality issue is in an early phase called "in triage" in which the responsible entity is required to triage the data quality issue. If the data quality issue is determined to be significant, the data quality can be escalated or one or more other actions can be performed to resolve the data quality issue.

Figure 6B:
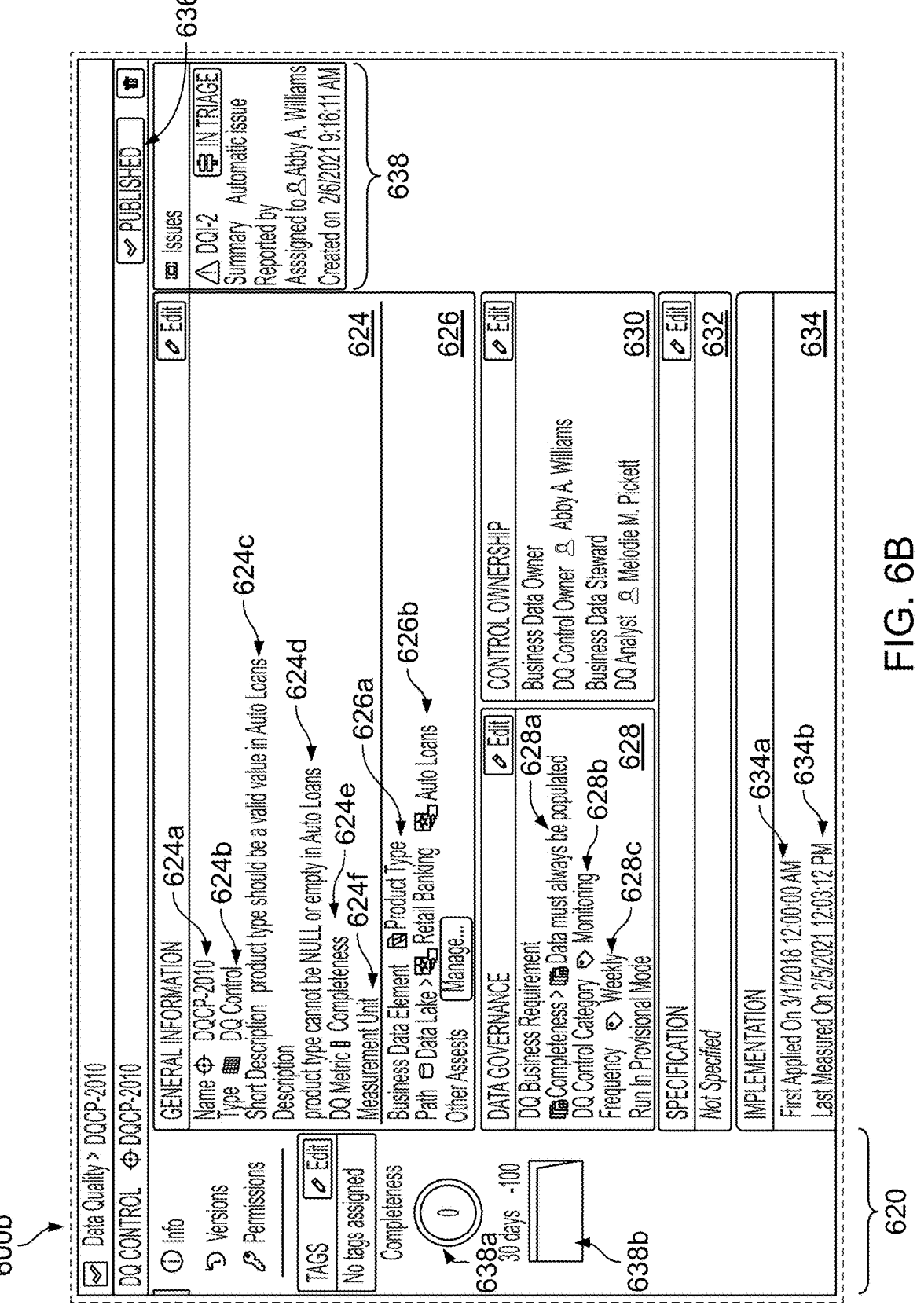

FIG. 6B shows a screen 600*b* represented a control point #2010 (called DQCP-2010) which is associated with DCI-2 of FIG. 6A. The control point configures the data quality tests that causes the data quality issue of FIG. 6A.

The screen 600*b* includes a general information window 624, similar to window 604 of FIG. 6A. The window 624 includes the control point name 624*a*. In this example, the control point name 624*a* is DQCP-2010, or data quality control point #2010. The window 624 shows a type 624*b* of the represented object, which is a data quality control point. The window 624 shows a description 624*c* of the data quality control point. Here, the description describes the data quality test configured by the data quality control point. The goal of the data quality test for this control point is that "the product type should be a valid value in Auto Loans." This indicates that the data quality test is configured to check for a valid value in a field called Auto Loans for checking for product types (e.g., in another field). The description 624*d* provides further information, specifying that the "product type cannot be NULL or empty in Auto Loans." This description 624*d* indicates what data quality rules are being applied. For example, no value in the Auto Loans field can be NULL or empty. If either rule condition is not satisfied, that value of the field fails the data quality test. In some implementations, the result data specify exactly which rule or condition for a data quality test was not satisfied. In some implementations, the results data indicate that at least one condition of a data quality test was not satisfied for a particular field without specifying which condition was not satisfied. The window 624 specifies which data quality metric 624*e* is being tested. In the example shown, the metric 624*f* is completeness of values being included the field for each record. The window 624 specifies testing unit 624*f* indicating how much data are being tested.

The screen 600*b* includes a window 626 specifying a source of the data being tested. For example, the window 626 specifies a business data element 626*a* including a product is being tested. The path 626*b* for the data is from a data lake>retail banking>auto loans dataset.

A data governance window 628 specifies aspects of the data quality test. The window 628 specifies a data quality business requirement 628*a*. This is a goal of the particular data quality test. Here, the goal is completeness of the dataset, and more specifically that each record of the dataset is populated with a valid value. The category 628*b* of the data quality test is monitoring. The frequency 628*c* of the data quality test is shown in the window 628. Here, the frequency 628*c* is weekly data quality tests.

The control ownership window 630 specifies the responsible entity or entities for resolving the data quality issue. The owner(s) for the data quality control point #2010 are the same as its associated data quality issue DCI-2. The assigned entity is Abbey A. Williams. A data quality analyst assigned for listening is Melodie M. Pickett.

The specification window 632 includes a specification (e.g., a workflow) identifier. In this example, no workflow is identified. The specification can be a graph or other logic.

The implementation window 634 includes data specifying when the data quality test(s) have been performed. Here, a first data quality test timestamp 634*a* and a most recent data quality test timestamp 634*b* are shown.

Window 620 shows results data 638 for the data quality test. The results data 638*a* includes a representation of the data quality test result, such as a percentage of passed records of all the records or as an absolute number of failed or passed records. The results data 638 includes a representation of trend data 638*b*. The trend data 638*b* show how the results of the data quality test have changed from a prior test or tests to the most recent test, either as an improvement or a deterioration of the data quality.

The data quality control point is associated with a status value 636. This is different from the state of the data quality issue(s) 638 associated with the data quality control point. Here, the status 636 is "published."

The data quality control point screen 600*b* shows each of the data quality issues 638 associated with the control point. Here, data quality issue DQI-2 (e.g., as summary data shown in FIG. 5) is shown inset in the data quality control data.

Figure 7:
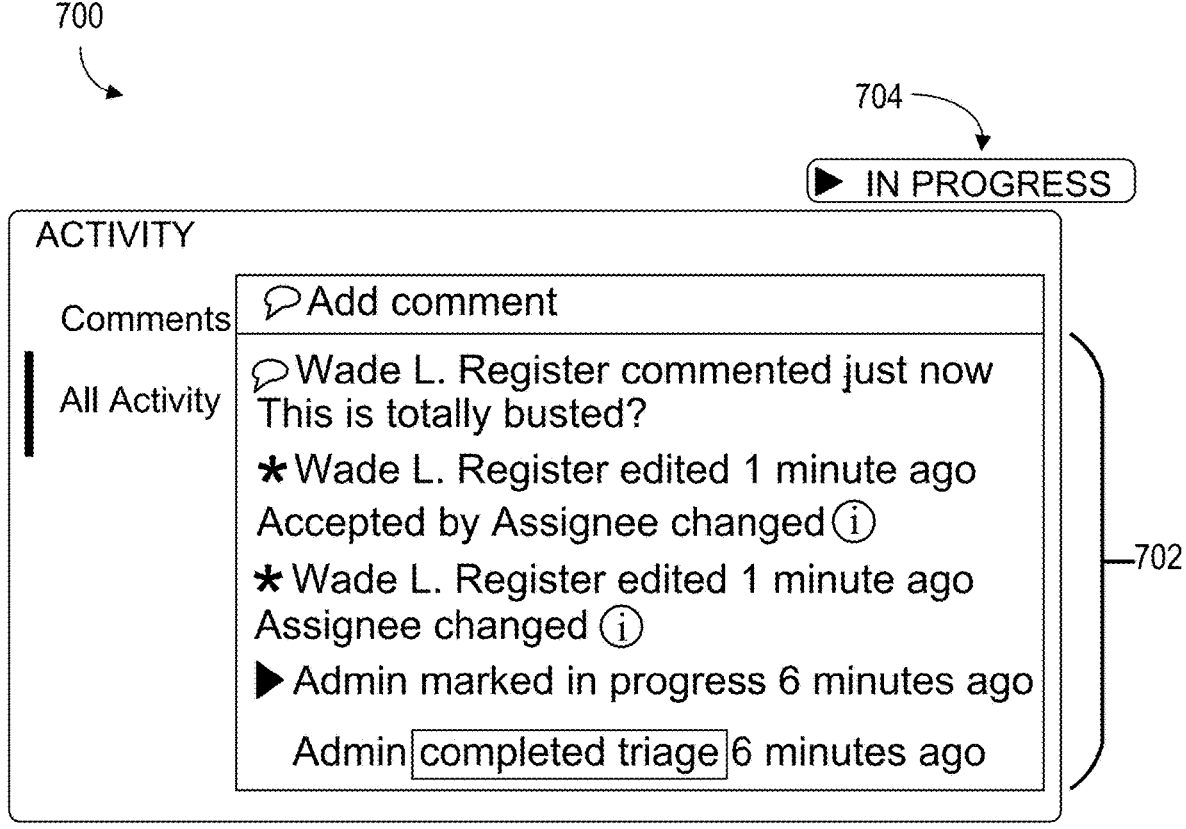
Figure 9:
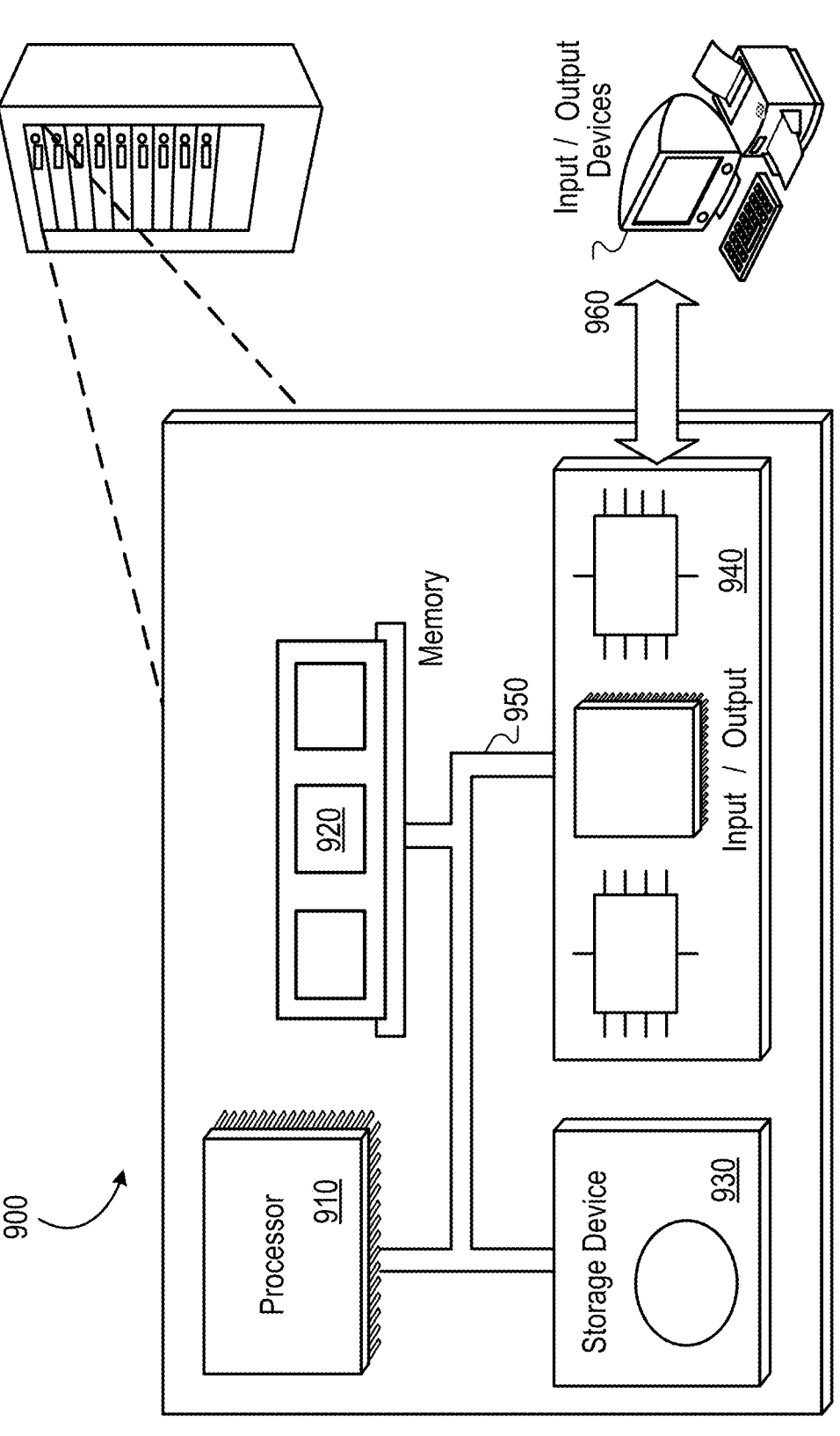
FIG. 9 is a block diagram of a data processing system.

FIG. 7 shows a portion of a user interface screen 700 representing a timeline 702 for a data quality issue. Here, the data quality issue state 704 is "in progress." The timeline 702 shows one or more entities and any actions each has taken with respect to the data quality issue and when. Here, a user Wade L. Register commented, edited, and accepted an assignee change for the data quality issue. An administrative entity changed the state of the data quality issue by completing triage. In an example, this could include an automated process.

FIG. 8 shows a process 800 for automated data quality issue generation and workflow generation. The process 800 can be implemented by a data processing system such as previously described. The process 800 includes receiving (802) results data specifying an output of a data quality test on data records; receiving (804) metadata associated with the results data, the metadata specifying a data quality condition of the data quality test and an object that configured the data quality test; generating (806) based on the results data and the metadata, a data quality issue, the data quality issue specifying a state for a workflow for processing the results data; and generating (808) the workflow for processing the results data based the state specified by the data quality issue. Generating the workflow includes: assigning (810), based on the results data and the state of the data quality issue, an entity responsible for resolving the data quality error; determining (812), based on the metadata, one or more actions for satisfying the data quality condition specified in the data quality test; and updating (814) the state associated with the data quality issue. The process includes sending (816) data representing the workflow to a workflow execution system.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, the modules of the data processing device 102 can be implemented using digital electronic circuitry, or in computer software, firmware, or hardware, or in combinations of one or more of them. In another example, the processes 900, 1000, 1100, and 1200, can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. In some implementations, the data processing system 100 comprises a data processing apparatus as described herein. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, e.g., both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

An example computer system includes a processor, a memory, a storage device, and an input/output device. Each of the components can be interconnected, for example, by a system bus. The processor is capable of processing instructions for execution within the system. In some implementations, the processor is a single-threaded processor, a multi-threaded processor, or another type of processor. The processor is capable of processing instructions stored in the memory or on the storage device. The memory and the storage device can store information within the system.

The input/output device provides input/output operations for the system. In some implementations, the input/output device can include one or more of a network interface device, e.g., an Ethernet card, a serial communication device, e.g., an RS-232 port, and/or a wireless interface device, e.g., an 802.11 card, a 3G wireless modem, a 4G wireless modem, a 5G wireless modem, etc. In some implementations, the input/output device can include driver devices configured to receive input data and send output data to other input/output devices, e.g., keyboard, printer and display devices. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, it will be understood that various modifications may be made without departing from the scope of the data processing system described herein. Accordingly, other embodiments are within the scope of the following claims.

What is claimed is:

1. A method for executing, by a data processing system, a workflow to process results data indicating an output of a data quality test on data records for generating, responsive to receiving the results data and metadata describing the results data, a data quality issue associated with a state of the workflow to resolve a data quality error associated with the data quality test, the method including:

receiving the results data specifying the output of the data quality test on the data records;

receiving the metadata associated with the results data, the metadata specifying prior results data of at least one prior output of the data quality test;

providing, based on the results data and the prior results data specified in the metadata, a data quality issue, the data quality issue including a state that can be maintained for the data quality issue in the workflow, the state indicative of one or more processing actions in the workflow for processing the results data to resolve the data quality issue;

executing the workflow for processing the results data based on the state of the data quality issue, wherein executing the workflow includes:

assigning, based on the results data and the state of the data quality issue, an entity responsible for resolving the data quality error;

determining, based on the prior results data specified in the metadata and the state, one or more processing actions of the workflow for resolving the data quality issue;

when the one or more processing actions are completed, updating the state of the data quality issue, the updated state indicating one or more processing actions in the workflow for resolving the data quality issue; and

storing data representing the updated state of the data quality issue, the updated state representing one or more subsequent processing actions to resolve the data quality issue by the workflow.

2. The method of claim 1, wherein the data quality issue is associated with a key value that identifies the data quality issue, and wherein the process includes:

determining, in response to receiving the metadata, that the data quality issue was already generated for a data source of the data records for the data quality test by evaluating the key value; and updating the already generated data quality issue based on the received results data of the data quality test and the received metadata, wherein updating the data quality issue includes changing the state specified by the data quality issue.

3. The method of claim 2, wherein updating the data quality issue includes reassigning the results data to a different entity based on the updated state specified by the data quality issue.

4. The method of claim 2, wherein updating the data quality issue includes appending a timeline of data processing actions associated with the data quality issue based on the updated state specified by the data quality issue.

5. The method of claim 2, wherein the metadata specifies a data quality condition of the data quality test, the method further including:

in response to updating the data quality issue, determining that the data quality condition is satisfied, wherein changing the state associated with the data quality issue includes indicating that the data quality issue is associated with a resolved data quality error.

6. The method of claim 2, wherein the key value is associating the data quality issue with additional data, the additional data including identifiers of client device(s) associated with the data quality issue, an owner of the data set with the data quality issue, an entity responsible for resolving the data quality issue, the workflow for correcting the data quality issue, and the state of the workflow.

7. The method of claim 2, wherein the updating of the data quality issue is performed without generating a new data quality issue.

8. The method of claim 1, further including:

receiving scheduling data for associating with the data quality issue, the scheduling data causing the data quality test to execute at predefined time intervals;

identifying the time interval associated with the data quality test; and sending data representing the time interval to the assigned entity.

9. The method of claim 1, wherein assigning the entity includes:

determining, from a data source of the data records, a set of eligible entities associated with the data source for being responsible for resolving the data quality error;

receiving selection criteria from the data source for assigning the entity from the set of eligible entities; and assigning the entity based on the selection criteria.

10. The method of claim 9, wherein the selection criteria specify a type of data quality error, wherein the metadata associated with the results data specify that the data quality issue is associated with the type of data quality error, and wherein the entity is eligible to resolve the type of data quality error.

11. The method of claim 9, wherein the selection criteria specify a particular state of the data quality issue for each entity of the set of eligible entities, and wherein the state of the data quality issue is the particular state for the assigned entity.

12. The method of claim 1, wherein the entity is a particular device of the data processing system.

13. The method of claim 1, wherein the entity is a user of the data processing system.

14. The method of claim 1, wherein executing the workflow further includes:

generating a timeline of actions taken for processing the results data; and sending data representing the timeline of actions taken to the entity.

15. The method of claim 1, wherein each state of the data quality issue is associated with one or more candidate actions for processing the results data.

16. The method of claim 1, further comprising:

determining, based on the results data and the metadata, a category of the data quality error, the category being selected from one of a data error, a rule error, or a reference data error.

17. The method of claim 1, wherein the data quality issue includes an identification of the data records being tested by the data quality test to obtain the received results data, data specifying which one or more data quality rules have been applied to the data records in the data quality test, and results for application of each of the data quality rules to the data records.

18. The method of claim 1, wherein the data quality issue specifies the one or more processing actions of the workflow for processing of the results data to resolve the data quality issue.

19. The method of claim 1, wherein the results data specify for portions of the data records whether the portions satisfy conditions specified in one or more data quality rules applied to the data records during the data quality test and the results data identify one or more conditions of the data quality rules that are not satisfied during the test and which portions of the data records did not satisfy the conditions.

20. The method of claim 1, wherein the results data specify how the data quality test failed, including that a data quality condition of a data quality rule of the test was not met.

21. The method of claim 1, wherein the processing actions include an analysis of values of the data records to determine if a data quality rule definition of the data quality test is flawed.

22. The method of claim 1, wherein the metadata specifies a data quality condition of the data quality test and an object that configured the data quality test, wherein the actions are for satisfying the data quality condition specified in the data quality test.

23. The method of claim 1, further comprising:

configuring the workflow using configurable data processing rules of the workflow based on the received metadata, such that different workflows are generated based on which data quality test failed and how the test failed.

24. The method of claim 1, wherein the one or more processing actions include:

determining that the data records are associated with a data source; and based on the data source, quarantining the data records, wherein the data quality issue indicates that the data records from the data source are being quarantined.

25. A system for executing, by a data processing system, a workflow to process results data indicating an output of a data quality test on data records by generating, responsive to receiving the results data and metadata describing the results data, a data quality issue associated with a state and one or more processing steps of the workflow to resolve a data quality error associated with the data quality test, the system including:

at least one processor; and a memory storing instructions that, when executed by the at least one processor, cause the at least one processor to perform operations including:

receiving the results data specifying the output of the data quality test on the data records;

receiving the metadata associated with the results data, the metadata specifying prior results data of at least one prior output of the data quality test;

providing, based on the results data and the prior results data specified in the metadata, a data quality issue, the data quality issue including a state that can be maintained for the data quality issue in the workflow, the state indicative of one or more processing actions in the workflow for processing the results data to resolve the data quality issue;

executing the workflow for processing the results data based on the state of the data quality issue, wherein executing the workflow includes:

assigning, based on the results data and the state of the data quality issue, an entity responsible for resolving the data quality error;

determining, based on the prior results data specified in the metadata and the state, one or more processing actions of the workflow for resolving the data quality issue;

when the one or more processing actions are completed, updating the state of the data quality issue, the updated state indicating one or more processing actions in the workflow for resolving the data quality issue; and storing data representing the updated state of the data quality issue, the updated state representing one or more subsequent processing actions to resolve the data quality issue by the workflow.

26. The system of claim 25, wherein the data quality issue is associated with a key value that identifies the data quality issue, and wherein the process includes:

determining, in response to receiving the metadata, that the data quality issue is already generated for a data source of the data records for the data quality test by evaluating the key value; and updating the data quality issue based on the results data of the data quality test, wherein updating the data quality issue includes changing the state associated with the data quality issue.

27. The system of claim 26, wherein updating the data quality issue includes reassigning the results data to a different entity.

28. The system of claim 26, wherein updating the data quality issue includes appending a timeline of data processing actions associated with the data quality issue.

29. One or more non-transitory computer readable media storing instructions for executing, by a data processing system, a workflow to process results data indicating an output of a data quality test on data records by generating, responsive to receiving the results data and metadata describing the results data, a data quality issue associated with a state and one or more processing steps of the workflow to resolve a data quality error associated with the data quality test, wherein executing the instructions by at least one processor causes the at least one processor to perform operations including:

receiving the results data specifying the output of the data quality test on the data records;

receiving the metadata associated with the results data, the metadata specifying prior results data of at least one prior output of the data quality test;

providing, based on the results data and the prior results data specified in the metadata, a data quality issue, the data quality issue including a state that can be maintained for the data quality issue in the workflow, the state indicative of one or more processing actions in the workflow for processing the results data to resolve the data quality issue;

executing the workflow for processing the results data based on the state of the data quality issue, wherein executing the workflow includes:

assigning, based on the results data and the state of the data quality issue, an entity responsible for resolving the data quality error;

determining, based on the prior results data specified in the metadata and the state, one or more processing actions of the workflow for resolving the data quality issue;

when the one or more processing actions are completed, updating the state of the data quality issue, the updated state indicating one or more processing actions in the workflow for resolving the data quality issue; and storing data representing the updated state of the data quality issue, the updated state representing one or more subsequent processing actions to resolve the data quality issue by the workflow.

30. The one or more non-transitory computer readable media of claim 29, wherein the data quality issue is associated with a key value that identifies the data quality issue, and wherein the process includes:

determining, in response to receiving the metadata, that the data quality issue is already generated for a data source of the data records for the data quality test by evaluating the key value; and updating the data quality issue based on the results data of the data quality test, wherein updating the data quality issue includes changing the state associated with the data quality issue.

* * * * *